US010365480B2

(12) United States Patent
Laroia et al.

(10) Patent No.: US 10,365,480 B2
(45) Date of Patent: Jul. 30, 2019

(54) METHODS AND APPARATUS FOR IMPLEMENTING AND/OR USING CAMERA DEVICES WITH ONE OR MORE LIGHT REDIRECTION DEVICES

(71) Applicant: LIGHT LABS INC., Palo Alto, CA (US)

(72) Inventors: Rajiv Laroia, Far Hills, NJ (US); Sapna A Shroff, Sunnyvale, CA (US); James Schmieder, Wayland, NY (US)

(73) Assignee: LIGHT LABS INC., Redwood City, CA (US)

( * ) Notice: Subject to any disclaimer, the term of this patent is extended or adjusted under 35 U.S.C. 154(b) by 447 days.

(21) Appl. No.: 15/195,985

(22) Filed: Jun. 28, 2016

(65) Prior Publication Data

US 2017/0059857 A1    Mar. 2, 2017

Related U.S. Application Data

(60) Provisional application No. 62/210,930, filed on Aug. 27, 2015.

(51) Int. Cl.
*G02B 27/00*    (2006.01)
*G03B 17/02*    (2006.01)
(Continued)

(52) U.S. Cl.
CPC ....... *G02B 27/0018* (2013.01); *G02B 17/008* (2013.01); *G02B 27/0006* (2013.01);
(Continued)

(58) Field of Classification Search
CPC ...... G03B 11/04; G03B 11/045; G03B 35/00; G03B 17/12; G03B 17/565; G02B 27/0018
See application file for complete search history.

(56) References Cited

U.S. PATENT DOCUMENTS 4,544,241 A    10/1985   LaBudde et al.
4,890,133 A    12/1989   Ogawa et al.
(Continued)

FOREIGN PATENT DOCUMENTS

EP    2642757 A2    9/2013
JP    10091765    4/1998
(Continued)

OTHER PUBLICATIONS

Notification of Transmittal of the International Search Report and the Written Opinion of the International Searching Authority or the Declaration, International Search Report and Written Opinion of the International Searching Authority from PCT/US2016/049065 dated Dec. 8, 2016 1-8 pages.
(Continued)

*Primary Examiner* — Minh Q Phan
(74) *Attorney, Agent, or Firm* — Straub & Straub; Michael P. Straub; Stephen T. Straub

(57) ABSTRACT

Methods and apparatus relating to a camera including one or more optical chains with a light redirection device, e.g., mirror, and an outer protective cover are described. The cover maybe a flat or sloped surface or a lens. Features avoid stray light rays from reaching an image sensor of an optical chain. In some but not all embodiments a 2-sided anti-reflection coating is used on the cover to avoid or reduce back reflections from the cover into the optical system. In some embodiments mirror angles are limited to a range in which stray light reflections are directed away from the camera module. In some embodiments a tilted cover configuration is used where the cover is sloped relative to a face of the camera and/or camera module. Different features such as the sloped cover glass, control of mirror angle, and/or antireflective coating can be used alone or in combination.

20 Claims, 14 Drawing Sheets

(51) Int. Cl.
  *H04N 5/217* (2011.01)
  *H04N 5/232* (2006.01)
  *H04N 5/225* (2006.01)
  *G02B 17/00* (2006.01)
  *H04N 5/247* (2006.01)
  *H04N 5/262* (2006.01)

(52) U.S. Cl.
  CPC ......... *H04N 5/2171* (2013.01); *H04N 5/2256* (2013.01); *H04N 5/2257* (2013.01); *H04N 5/23296* (2013.01); *H04N 5/247* (2013.01); *H04N 5/262* (2013.01)

(56) References Cited

U.S. PATENT DOCUMENTS

| | | | |
|---|---|---|---|
| 5,078,479 A | 1/1992 | Vuilleumier | |
| 5,153,569 A | 10/1992 | Kawamuraa et al. | |
| 5,353,068 A | 10/1994 | Moriwake | |
| 5,583,602 A | 12/1996 | Yamamoto | |
| 5,781,331 A | 7/1998 | Carr et al. | |
| 5,889,553 A | 3/1999 | Kino et al. | |
| 5,975,710 A | 11/1999 | Luster | |
| 5,982,951 A | 11/1999 | Katayama et al. | |
| 6,011,661 A | 1/2000 | Weng | |
| 6,028,600 A | 2/2000 | Rosin et al. | |
| 6,081,670 A | 6/2000 | Madsen et al. | |
| 6,141,034 A | 10/2000 | McCutchen | |
| 7,009,652 B1 | 3/2006 | Tanida et al. | |
| 7,280,735 B2 | 10/2007 | Thibault | |
| 7,315,423 B2 | 1/2008 | Sato | |
| 7,509,041 B2 * | 3/2009 | Hosono | G03B 17/12 396/322 |
| 7,551,358 B2 | 6/2009 | Lee et al. | |
| 7,561,201 B2 | 7/2009 | Hong | |
| 7,801,428 B2 | 9/2010 | Nagaishi et al. | |
| 7,810,511 B2 | 10/2010 | Fagrenius et al. | |
| 8,144,230 B2 | 3/2012 | Watanabe et al. | |
| 8,194,169 B2 | 6/2012 | Tamaki et al. | |
| 8,199,222 B2 | 6/2012 | Drimbarean et al. | |
| 8,237,841 B2 | 8/2012 | Tanida et al. | |
| 8,320,051 B2 | 11/2012 | Matsumura et al. | |
| 8,417,058 B2 | 4/2013 | Tardif | |
| 8,482,637 B2 | 7/2013 | Ohara et al. | |
| 8,520,022 B1 | 8/2013 | Cohen et al. | |
| 8,553,106 B2 | 10/2013 | Scarff | |
| 8,619,082 B1 | 12/2013 | Ciurea et al. | |
| 8,639,296 B2 | 1/2014 | Ahn et al. | |
| 8,665,341 B2 | 3/2014 | Georgiev et al. | |
| 8,704,944 B1 | 4/2014 | Wierzoch et al. | |
| 8,762,895 B2 | 6/2014 | Mehta et al. | |
| 8,780,258 B2 | 7/2014 | Lee | |
| 8,896,655 B2 | 11/2014 | Mauchly et al. | |
| 9,041,826 B2 | 5/2015 | Jung et al. | |
| 9,104,705 B2 | 8/2015 | Fujinaga | |
| 9,135,732 B2 | 9/2015 | Winn et al. | |
| 9,197,816 B2 | 11/2015 | Laroia | |
| 9,270,876 B2 | 2/2016 | Laroia | |
| 9,282,228 B2 | 3/2016 | Laroia | |
| 9,325,906 B2 | 4/2016 | Laroia | |
| 9,374,514 B2 | 6/2016 | Laroia | |
| 9,423,588 B2 | 8/2016 | Laroia | |
| 9,426,365 B2 | 8/2016 | Laroia et al. | |
| 9,451,171 B2 | 9/2016 | Laroia | |
| 9,462,170 B2 | 10/2016 | Laroia et al. | |
| 9,467,627 B2 | 10/2016 | Laroia | |
| 9,544,501 B2 | 1/2017 | Laroia | |
| 9,544,503 B2 | 1/2017 | Shroff | |
| 9,547,160 B2 | 1/2017 | Laroia | |
| 9,549,127 B2 | 1/2017 | Laroia | |
| 9,551,854 B2 | 1/2017 | Laroia | |
| 9,554,031 B2 | 1/2017 | Laroia et al. | |
| 9,557,519 B2 | 1/2017 | Laroia | |
| 9,557,520 B2 | 1/2017 | Laroia | |
| 9,563,033 B2 | 2/2017 | Laroia | |
| 9,568,713 B2 | 2/2017 | Laroia | |
| 9,578,252 B2 | 2/2017 | Laroia | |
| 9,671,595 B2 | 6/2017 | Laroia | |
| 9,686,471 B2 | 6/2017 | Laroia et al. | |
| 9,690,079 B2 | 6/2017 | Laroia | |
| 9,736,365 B2 | 8/2017 | Laroia | |
| 9,749,511 B2 | 8/2017 | Laroia | |
| 9,749,549 B2 | 8/2017 | Shroff | |
| D802,646 S | 11/2017 | Laroia et al. | |
| 9,824,427 B2 | 11/2017 | Pulli et al. | |
| 2002/0149691 A1 | 10/2002 | Pereira et al. | |
| 2003/0018427 A1 | 1/2003 | Yakota et al. | |
| 2003/0020814 A1 | 1/2003 | Ono | |
| 2003/0185551 A1 | 10/2003 | Chen | |
| 2004/0027695 A1 | 2/2004 | Lin | |
| 2004/0100479 A1 | 5/2004 | Nakano et al. | |
| 2004/0227839 A1 | 11/2004 | Stavely et al. | |
| 2005/0088546 A1 | 4/2005 | Wang | |
| 2005/0200012 A1 | 9/2005 | Kinsman | |
| 2006/0067672 A1 | 3/2006 | Washisu et al. | |
| 2006/0187311 A1 | 8/2006 | Labaziewicz et al. | |
| 2006/0187338 A1 | 8/2006 | May et al. | |
| 2006/0221218 A1 | 10/2006 | Alder et al. | |
| 2006/0238886 A1 | 10/2006 | Kushida et al. | |
| 2006/0281453 A1 | 12/2006 | Jaiswal et al. | |
| 2007/0050139 A1 | 3/2007 | Sidman | |
| 2007/0065012 A1 | 3/2007 | Yamakado et al. | |
| 2007/0127915 A1 | 6/2007 | Lu et al. | |
| 2007/0177047 A1 | 8/2007 | Goto | |
| 2007/0182528 A1 | 8/2007 | Breed et al. | |
| 2008/0030592 A1 | 2/2008 | Border et al. | |
| 2008/0074755 A1 | 3/2008 | Smith | |
| 2008/0084484 A1 | 4/2008 | Ochi et al. | |
| 2008/0111881 A1 | 5/2008 | Gibbs et al. | |
| 2008/0180562 A1 | 7/2008 | Kobayashi | |
| 2008/0211941 A1 | 9/2008 | Deever et al. | |
| 2008/0219654 A1 | 9/2008 | Border et al. | |
| 2008/0240698 A1 | 10/2008 | Bartilson et al. | |
| 2008/0247745 A1 | 10/2008 | Nilsson | |
| 2008/0251697 A1 | 10/2008 | Park et al. | |
| 2008/0278610 A1 | 11/2008 | Boettiger | |
| 2009/0086032 A1 | 4/2009 | Li | |
| 2009/0136223 A1 | 5/2009 | Motomura et al. | |
| 2009/0154821 A1 | 6/2009 | Sorek et al. | |
| 2009/0225203 A1 | 9/2009 | Tanida et al. | |
| 2009/0278950 A1 | 11/2009 | Deng et al. | |
| 2009/0290042 A1 | 11/2009 | Shiohara | |
| 2010/0013906 A1 | 1/2010 | Border et al. | |
| 2010/0034531 A1 | 2/2010 | Go | |
| 2010/0045774 A1 | 2/2010 | Len et al. | |
| 2010/0053414 A1 | 3/2010 | Tamaki et al. | |
| 2010/0079635 A1 | 4/2010 | Yano et al. | |
| 2010/0091089 A1 | 4/2010 | Cromwell et al. | |
| 2010/0097443 A1 | 4/2010 | Lablans | |
| 2010/0225755 A1 | 9/2010 | Tamaki et al. | |
| 2010/0238327 A1 | 9/2010 | Griffith et al. | |
| 2010/0265346 A1 | 10/2010 | Iizuka | |
| 2010/0296802 A1 | 11/2010 | Davies | |
| 2011/0051243 A1 | 3/2011 | Su | |
| 2011/0063325 A1 | 3/2011 | Saunders | |
| 2011/0069189 A1 | 3/2011 | Venkataraman et al. | |
| 2011/0080655 A1 | 4/2011 | Mori | |
| 2011/0122223 A1 * | 5/2011 | Gruber | G01C 11/025 348/36 |
| 2011/0123115 A1 | 5/2011 | Lee et al. | |
| 2011/0128393 A1 | 6/2011 | Tavi et al. | |
| 2011/0157430 A1 | 6/2011 | Hosoya et al. | |
| 2011/0157451 A1 | 6/2011 | Chang | |
| 2011/0187878 A1 | 8/2011 | Mor et al. | |
| 2011/0193984 A1 | 8/2011 | Kitaya et al. | |
| 2011/0221920 A1 | 9/2011 | Gwak | |
| 2011/0222167 A1 | 9/2011 | Iwasawa | |
| 2011/0242342 A1 | 10/2011 | Goma et al. | |
| 2011/0280565 A1 | 11/2011 | Chapman et al. | |
| 2011/0285895 A1 | 11/2011 | Weng et al. | |
| 2012/0002096 A1 | 1/2012 | Choi et al. | |
| 2012/0033069 A1 | 2/2012 | Becker et al. | |
| 2012/0062691 A1 | 3/2012 | Fowler et al. | |
| 2012/0155848 A1 | 6/2012 | Labowicz et al. | |

(56) References Cited

U.S. PATENT DOCUMENTS

| | | |
|---|---|---|
| 2012/0162464 A1 | 6/2012 | Kim |
| 2012/0188391 A1 | 7/2012 | Smith |
| 2012/0027462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0020470 A1 | 1/2013 | Luo et al. |
| 2013/0027353 A1 | 1/2013 | Hyun |
| 2013/0050489 A1* | 2/2013 | Taylor .................. B60R 11/04 348/148 |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0055624 A1* | 2/2014 | Gaines .................. H04N 5/2254 348/207.1 |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0240579 A1 | 8/2014 | Park et al. |
| 2014/0267243 A1 | 9/2014 | Venkataraman et al. |
| 2014/0267844 A1 | 9/2014 | Iwata et al. |
| 2014/0293079 A1 | 10/2014 | Milanfar et al. |
| 2014/0354714 A1 | 12/2014 | Hirschler et al. |
| 2015/0029595 A1 | 1/2015 | Swihart et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0253647 A1 | 9/2015 | Mercado |
| 2015/0279012 A1 | 10/2015 | Brown et al. |
| 2015/0296149 A1 | 10/2015 | Laroia |
| 2016/0004144 A1 | 1/2016 | Laroia et al. |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0142610 A1 | 5/2016 | Rivard et al. |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

FOREIGN PATENT DOCUMENTS

| | | |
|---|---|---|
| JP | 1164739 A | 3/1999 |
| JP | 2001061109 | 3/2001 |
| JP | 2003241260 A | 8/2003 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010230879 A | 10/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |
| RU | 2350992 C2 | 7/2006 |
| WO | 2009145401 A1 | 12/2009 |
| WO | 2012089895 A1 | 7/2012 |

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

* cited by examiner

METHODS AND APPARATUS FOR IMPLEMENTING AND/OR USING CAMERA DEVICES WITH ONE OR MORE LIGHT REDIRECTION DEVICES

RELATED APPLICATIONS

The present application claims the benefit of U. S. Provisional Patent Application Ser. No. 62/210,930 filed Aug. 27, 2015 which is hereby expressly incorporated by reference in its entirety.

FIELD

The present application relates to image capture and generation methods and apparatus and, more particularly, to methods and apparatus relating to a camera device which include one or more optical chains which include a light redirection device such as a mirror.

BACKGROUND

Camera devices which use cover glass or a lens to protect an optical chain from dust or other debris entering the optical chain may suffer from reflections when the optical chain includes a mirror.

Many times stray light at off angles may enter via the light entry opening of the camera. Stray light entering the light path of the optical chain maybe reflected off the mirror up towards the cover glass or lens from where it reflects back again down towards the mirror. Many times such stray light hitting the mirror for a second time after being reflected by the cover glass may, depending on the configuration of the optical chain and arrangement of elements, proceed towards the image sensor of an optical chain and thus form unwanted image.

While such reflections may not be significant for most objects, when a light source itself is the source of the stray light, it maybe of sufficient intensity that the reflected stray light maybe noticeable in the captured image. This can result in what appears to be a strange image of, for example, a light fixture appearing in an image of an intended object in the field of view when the light source was not in the original intended field of view. This effect is sometimes referred to as "ghosting" since the light source which had some of its rays unintentionally reflected on to the image sensor of an optical chain appears as a faint image, e.g., as a "ghost image" at a location in the captured scene where the light fixture is not actually located.

Given that such ghosting effect is undesirable and for objects outside an intended field of view to appear as "ghosts" in a captured image degrades the desirability of the captured image, there is a need for methods, apparatus and/or camera element configurations which allow for a mirror or other light redirection element to be used without causing significant unintentional ghosting of objects, such as light sources, in an image.

SUMMARY

Methods and apparatus relating to a camera device which include one or more optical chains which include a light redirection device such as a mirror, are described. Depending on the embodiment the camera device may also include one or more optical chains which do not include a light redirection device.

While the phrase camera module is sometimes used interchangeable with optical chain, with regard to optical chains which include a light redirection device such as a mirror, the phase optical chain will be used to refer to the assembly of elements including the light redirection device as well as lens and sensor of the optical chain. In the case of an optical chain including a light redirection device the term camera module may be and sometimes is used to refer to the portion of the optical chain that follows the mirror, e.g., a sensor and/or one or more lenses in combination with a sensor.

In various embodiments novel configurations for arrangement of camera elements such as the optical chain, e.g., camera module, mirror and/or protective cover plate, are employed to avoid stray light rays from reaching image sensor of the optical chain.

Various configurations and arrangements of camera elements have been described for camera devices that use outer protective elements such a cover glass, lens, plastic plates etc., to protect optical chains used with light redirection devices. Various features and/or configurations of the camera elements allow minimizing the likelihood of stray light back reflections getting to the camera modules of the camera and thus help in avoiding formation of ghost images.

In some embodiments a slope is used in the portion of a cover glass which covers the opening of an optical chain which includes a reflective element to reduce the risk of light being reflected towards the sensor. The slope may be used alone or in combination with other features such as an antireflective coating on one or both sides of the portion of the cover glass covering an opening. Alternatively, depending on the embodiment a slope may not be used and an antireflective coating or another feature may be used to reduce the risk of stray light being reflected towards a sensor of an optical chain.

In accordance with one feature of some but not all embodiments a 2-sided anti-reflection (AR) coating is used on a protective element such as the cover glass covering an aperture of an optical chain. In some embodiments, anti-reflection coating on both sides of the cover glass with reflectance as low as, e.g., 0.3%, is used. In some embodiments such AR coatings mitigates and reduces the visibility of the ghost reflection in a captured image. However for camera devices included in hand held devices like a cell phone, the front/outer side of the AR coated protective element such as the cover glass is exposed to the environment and the AR coating may be easily degraded or even rendered ineffective with time due to scratching damage caused by fingers, keys (in a pocket), rough cell phone holders etc. In some such embodiments the outer surface of the cover glass is not AR coated or portions which are AR coated are at least partially recessed to reduce the risk of the AR coating being removed due to scratches.

In some embodiments limiting mirror movement to a range of specific mirror angles relative to face of a camera lens of a camera module to which the mirror corresponds are used to avoid stray light reflections getting to the camera module.

In some embodiment mirror angle is changed from so that a range of about 45° to about 36° is supported. In some embodiments the range does not include 45 degrees but can assume any angle less than 45 degrees down to and including an angle of 36 degrees. When a stray light ray enters the camera opening and reaches the mirror angled at 36° it is first reflected towards the cover glass at such an angle that upon incidence on the cover glass surface it is bounced back again towards the mirror where the light rays undergoes another redirection away from the camera module and/or does not enter the camera module at an angle that would allow the stray light ray to reach the image sensor. Since the stray light ray is finally redirected such that it does not reach the sensor the problem of ghosting is either eliminated in most cases or minimized. While such a configuration where the mirror is rotated about the hinge positioned close to the center of the mirror facilitates easy rotation of the mirror to achieve the desired angle, e.g., 36°, thereby reducing the likelihood of stray light rays reaching the image sensor of a camera module, however in some such configurations at least some light rays within the desired field of may get clipped/vignetted by the camera body, chassis and/or lens barrel assembly of camera module.

To avoid the clipping/vignetting issue in one particular exemplary configuration of the light redirection element which results in achieving the desired mirror angle to avoid ghosting problem is used in some embodiments where the mirror is supported by a hinge positioned at the top edge of the mirror, e.g., located near the face of the camera device. In this configuration the hinge at the top allows mirror to be rotated inwards, away from the face and towards the inside of the camera, from a default angle to one or more angles that minimize the chances of reflected stray light rays reaching the image sensor of the camera module. Thus in some embodiments a configuration where the hinge is positioned close to the top edge of the mirror is used to achieve steeper mirror angles to avoid image ghosting and such a configuration also eliminates or significantly reduces the clipping/vignetting of desired light rays within the field of view.

In some embodiments a tilted outer protective element, e.g., cover glass, configuration is used to address the ghosting problem. In such embodiments the cover glass via which the light enters is tilted, e.g., sloped, relative to the front surface or a face surface of the camera device. By changing the tilt angle of the cover glass above the mirror relative to the face surface of the camera device the ghost reflection issue is greatly reduced or eliminated in some embodiments. In this configuration the outer protective element is sloped relative to a face of camera device and extending at least partially below the surface of the face of the camera. In some embodiments a cover glass, a flat plastic plate or a lens is used as the outer protective element through which light can pass and reach the mirror and camera module. In the tilted cover plate embodiment if stray light reflects back from the cover plate inside surface it does not bounce back in the camera module within the angle of the lens field of view (FOV) and thus does not reach the image sensor. The tilted cover glass approach can be, and in some embodiments is, additionally combined with double sided AR coating on the cover glass because the cover glass is depressed into the device in some such embodiments and thus there in no risk of getting the AR coating damaged. Further more the titled cover glass configuration may be, and in some embodiments is, used both with the normal 45° mirror angle configuration and other mirror angle configurations, e.g., 36° mirror angle configuration. Thus it should be appreciated that numerous variations and configurations are possible.

A camera device may include camera modules having different configurations and/or with one or more different features or combinations of features intended to reduce or avoid ghosting due to reflections in camera modules including mirrors.

While numerous features have been described it should be appreciated that the features can be used individually or in combination. For example not all optical chains need to use an antireflective (AR) coating and not all optical chains need to use a sloped surface. Accordingly, the features can be used alone or in combination and the particular exemplary combinations are intended to be exemplary and not recite a critical combination of features with in some cases a single feature being sufficient to address the problem of possible reflections.

An exemplary camera device in accordance with one embodiment comprises: a first optical chain including: a first outer protective element sloped relative to a face of said camera device and extending at least partially below the surface of said face of said camera, said outer protective element being a first lens or cover through which light can pass; a light redirection device; and a sensor. Other configurations and embodiments are possible and discussed below.

Numerous additional features and embodiments, and variations are discussed and described in the detailed description which follows.

DETAILED DESCRIPTION

Figure 1:
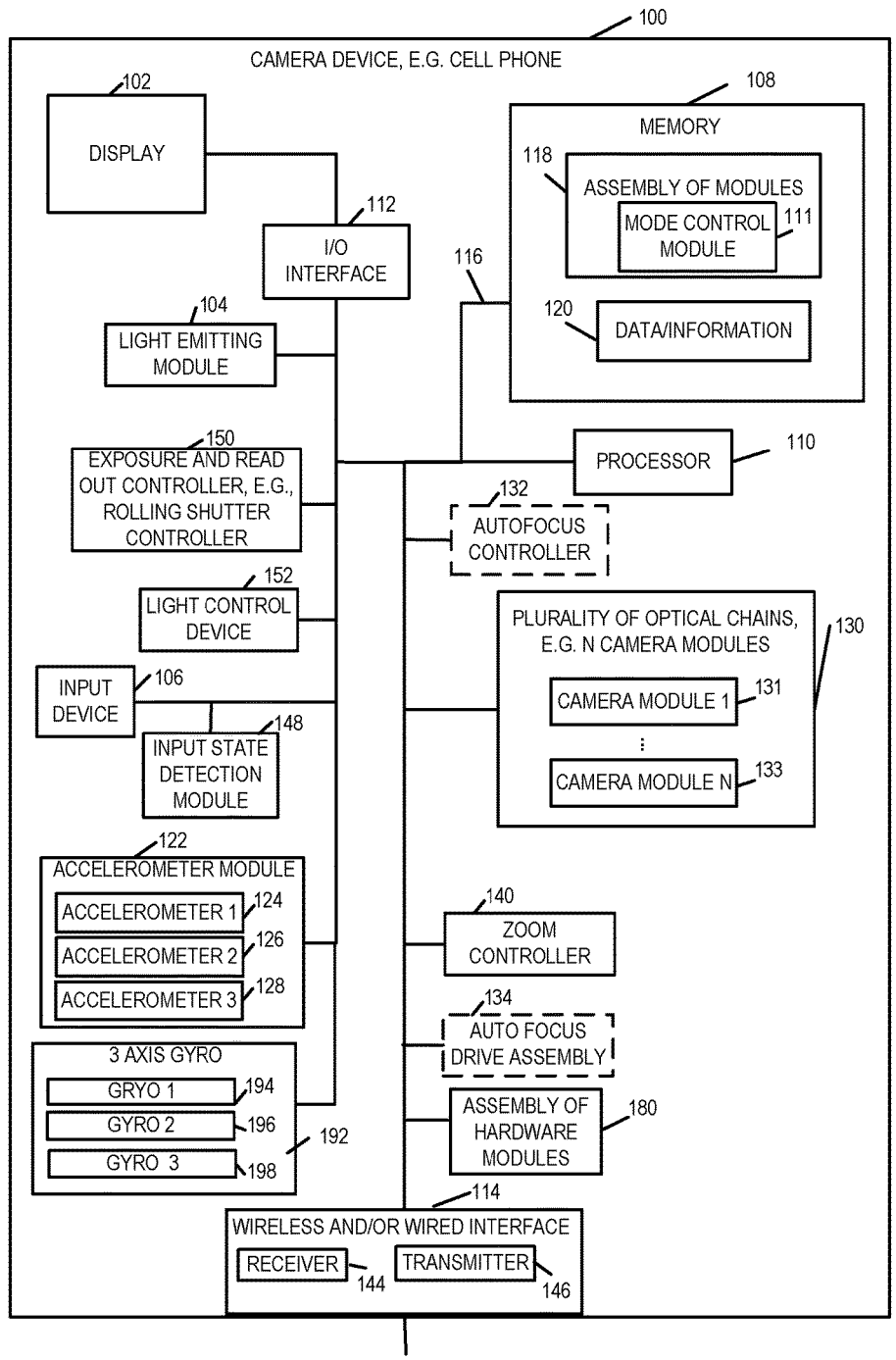
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which may be LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140, to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The camera device 100 also includes a user interface module 179 which may be and sometimes is implemented in hardware, e.g., as a circuit such as an ASIC, while in other embodiments the user interface 179 is implemented in software which, when executed by the processor 110 causes the processor 110 to control the camera device to implement one or more of the user interface methods and features described herein.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor may be a dedicated processor that is preconfigured to implement the methods of the present invention. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 (discussed in detail later with regard to FIG. 19) wherein one or more modules include one or more software routines, e.g., machine executable instructions, for implementing the image capture, image generation and/or image data processing methods of the present invention. Individual steps and/or lines of code in the modules of 118 when executed by the processor 110 control the processor 110 to perform steps of the method of the invention, e.g., generating depth map, determining maximum expected frequencies and/or filtering image portions, in accordance with the invention. When executed by processor 110, the assembly of modules 118 cause at least some data to be processed by the processor 110 in accordance with the method of the present invention, e.g., filtering image portions in accordance with the invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules 180.

The resulting data and information (e.g., captured images of a scene, combined or composite images of a scene, filtered images etc.) are stored in data/information block 120 for future use, additional processing, and/or output, e.g., to display device 102 for display or to another device for transmission, processing and/or display. In some embodiments the data/information block 120 further includes optical chain information, e.g., optical characteristics, corresponding to the plurality of optical chains 130 in the device 100. If one or more parameters/settings in the optical characteristics of a camera module changes then the corresponding optical chain information stored in the data/information 120 is updated. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
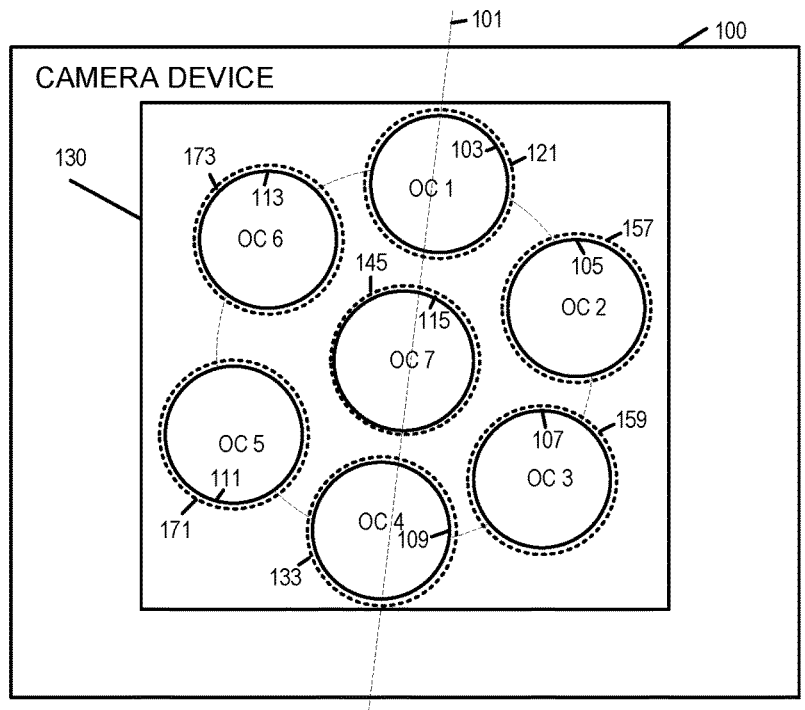
FIG. 2 illustrates a frontal view of an apparatus implemented in accordance with an exemplary embodiment which incorporates multiple optical chains, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
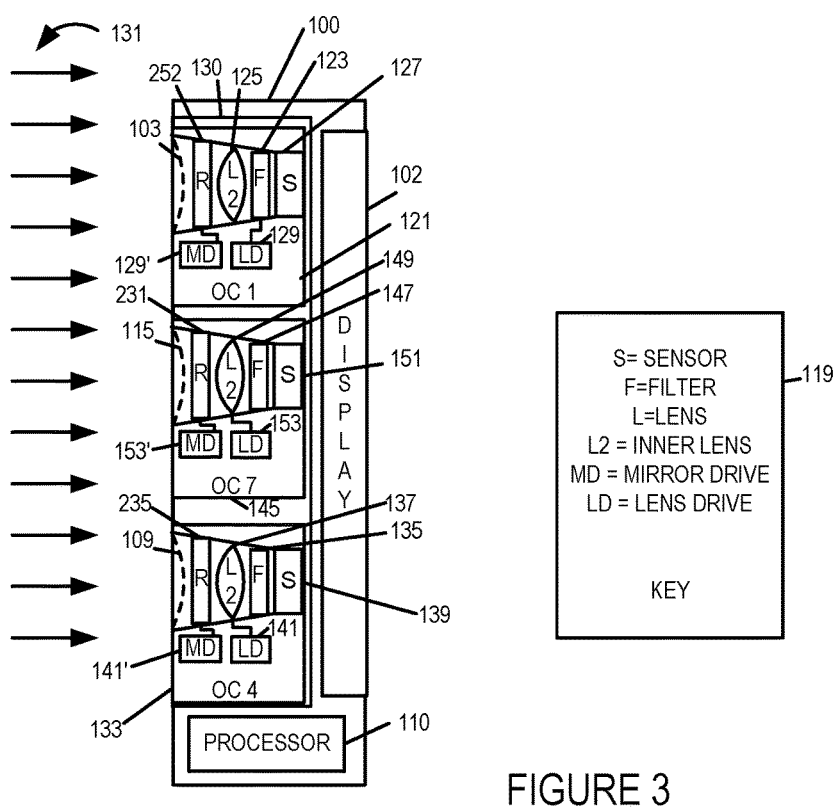
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 shows optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

While seven optical chains are shown in FIG. 2, it should be appreciated that other numbers of optical chains are possible. For example, as shown in FIGS. 7A and 7B seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
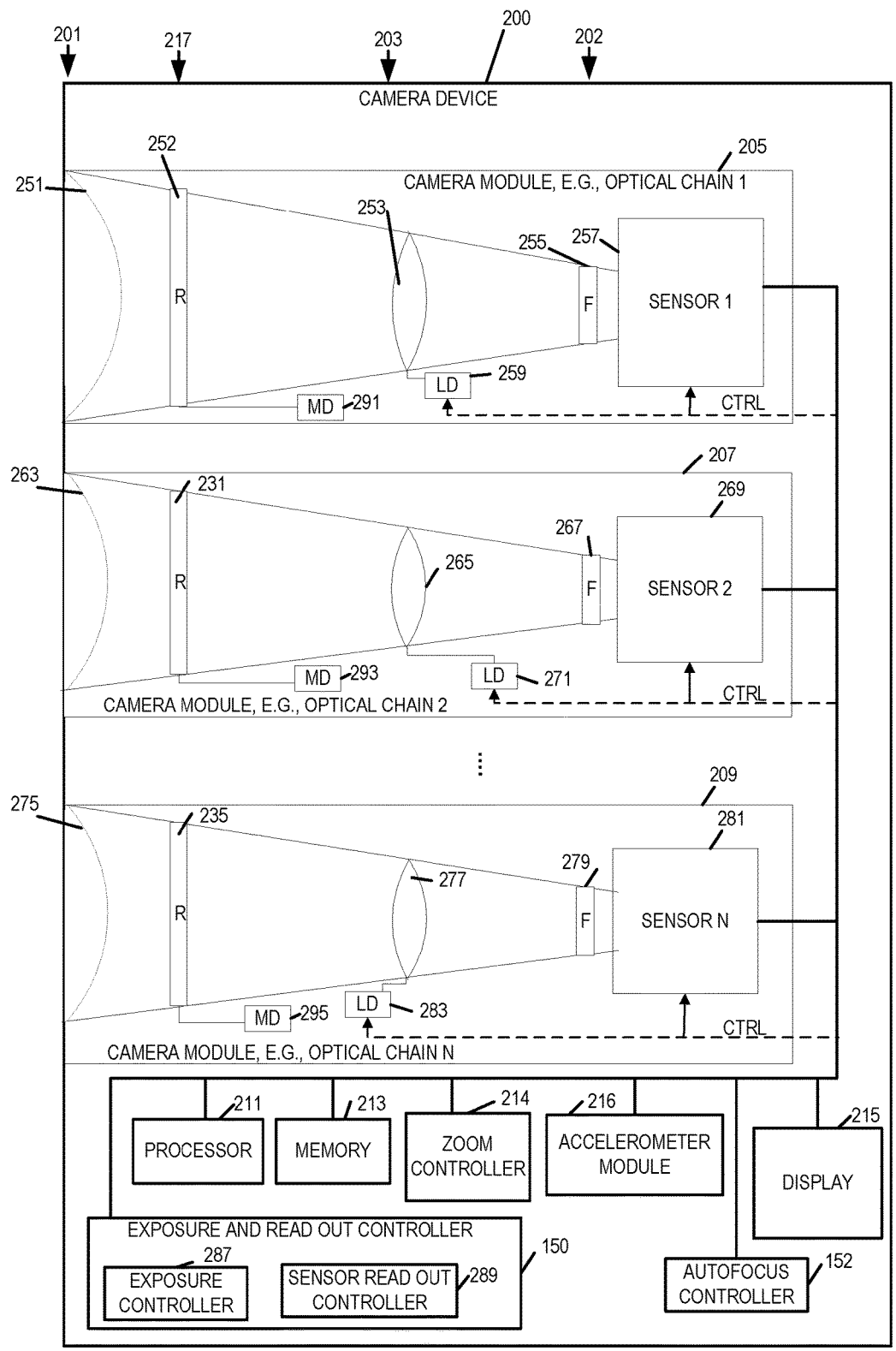
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
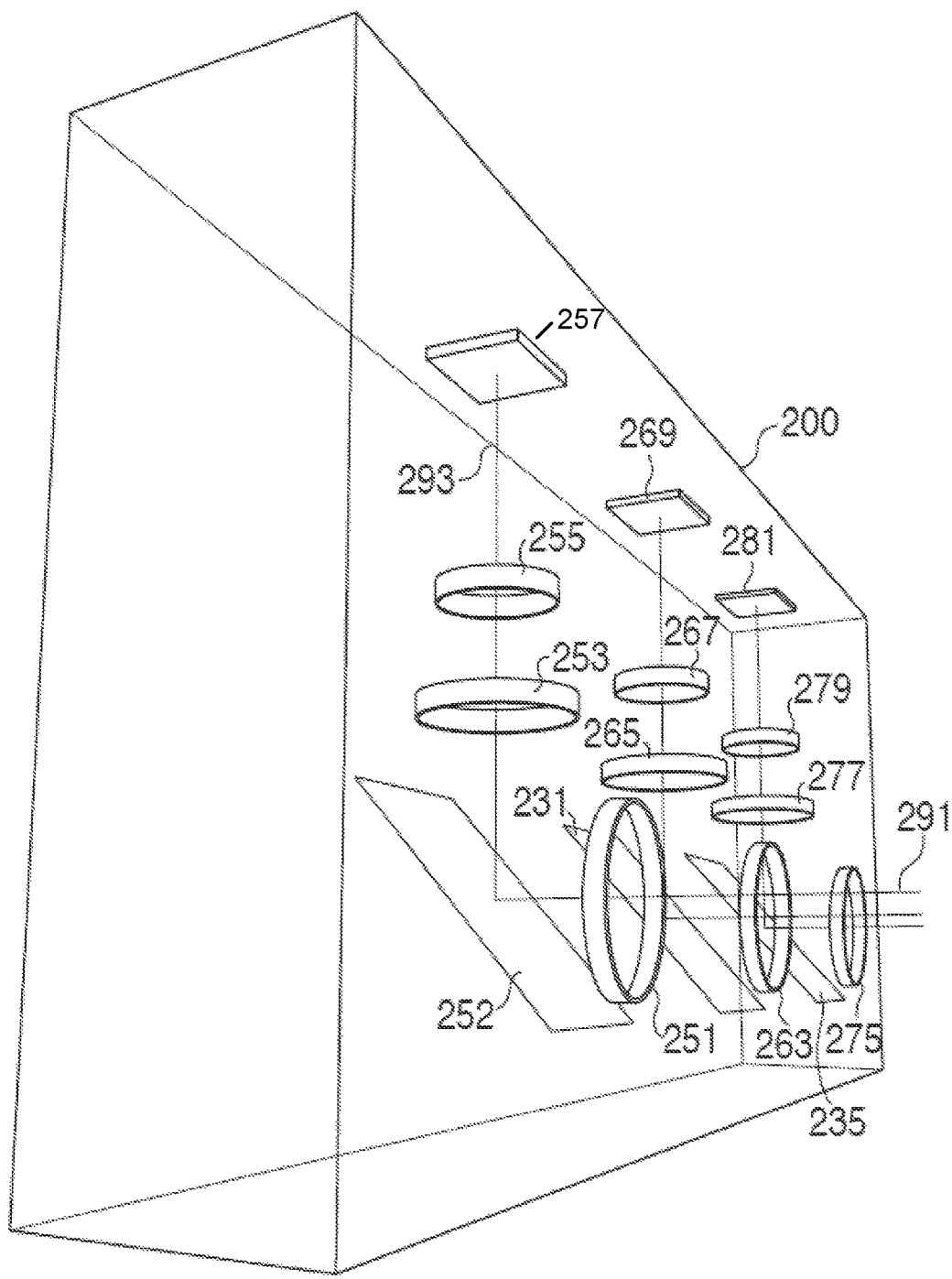
FIG. 4B illustrates the optical chains of the camera device shown in FIG. 4A, as implemented in one particular exemplary embodiment, in greater detail.
Figure 5:
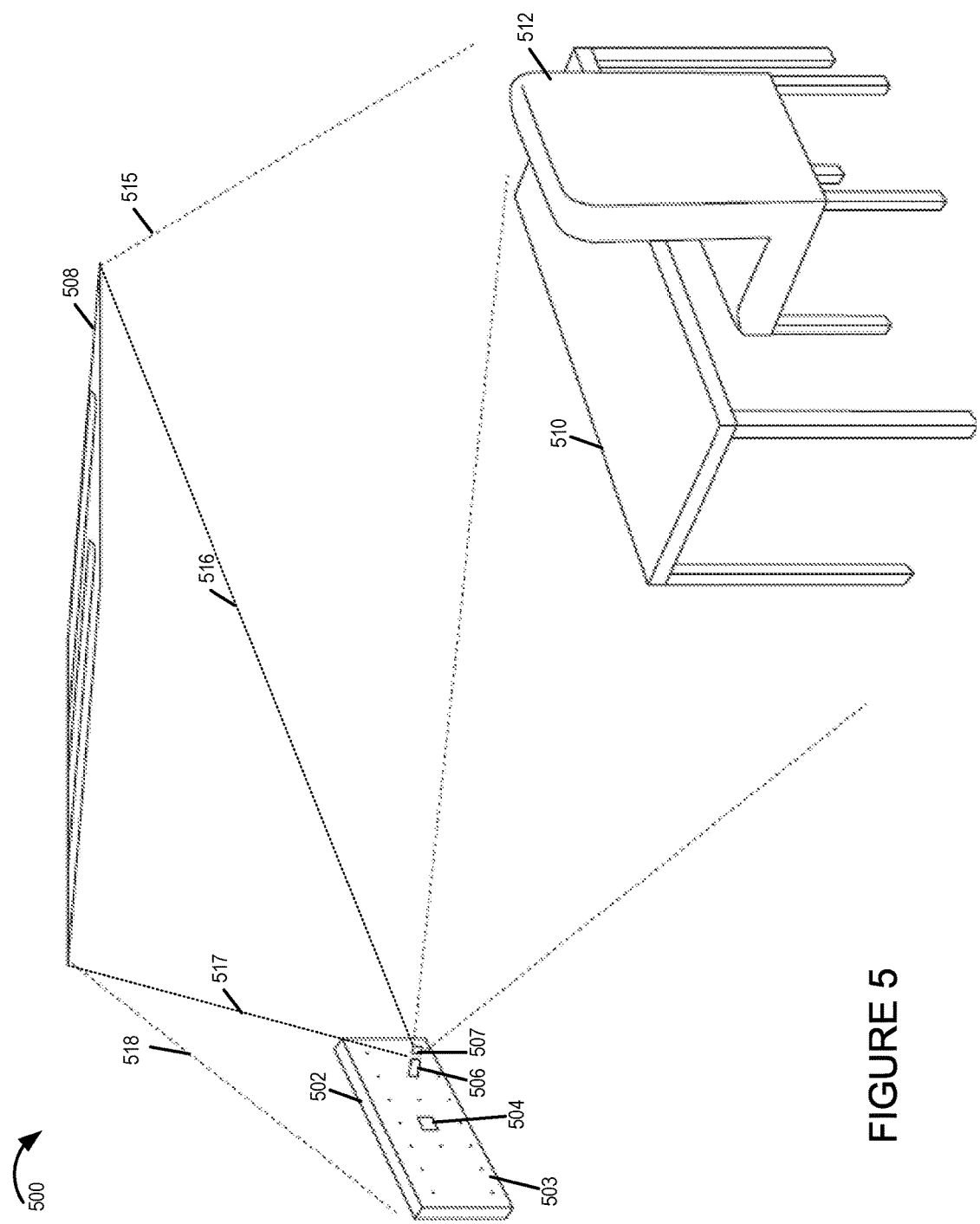
FIG. 5 illustrates an example image capture scenario where an unwanted source of high intensity light is present that can cause a ghost reflection to appear in a captured image.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 is a drawing 500 illustrating an exemplary image capture scenario where an unwanted source of high intensity light, e.g., light source 508, is present that causes a ghost reflection to appear in a captured image due to some of the unwanted light rays from the light source 508 affecting the image capture operation performed by one or more camera modules of an exemplary camera 502. In the illustrated example the light source 508 is outside the field of view of the camera device 502 used to capture an image of a scene area of interest including, e.g., a table 510 and chair 512. The camera device 502 may be the same or similar to the camera device 100/200 discussed above and includes a plurality of optical chains, e.g., camera modules, such as those discussed with regard to FIGS. 2-4. At least some of the camera modules in camera device 502 include or are coupled to corresponding light reflection elements, e.g., mirror. While the camera device 502 may include more, in the illustration 500 two camera modules are shown to facilitate an understanding of the concept. The arrangement of the optical chains in the camera device 502 is such that the first camera module 506 is placed in the camera 502 at an angle with respect to the horizontal, e.g., horizontal surface of 503 of the camera housing, while the second camera module 504 is placed parallel to the horizontal. The mirror 507, which may be part of the camera module 506, is also at an angle with respect to the horizontal. The unwanted light rays from the light source 508 are reflect by the mirror 507 and enter the camera module 506 while not being able to enter camera module 504. The unwanted light rays (e.g., represented by 516, 517) traverse through the camera module 506 making their way to the image sensor of the camera module 506 and thus causing an unwanted ghost image to be formed.

Figure 6:
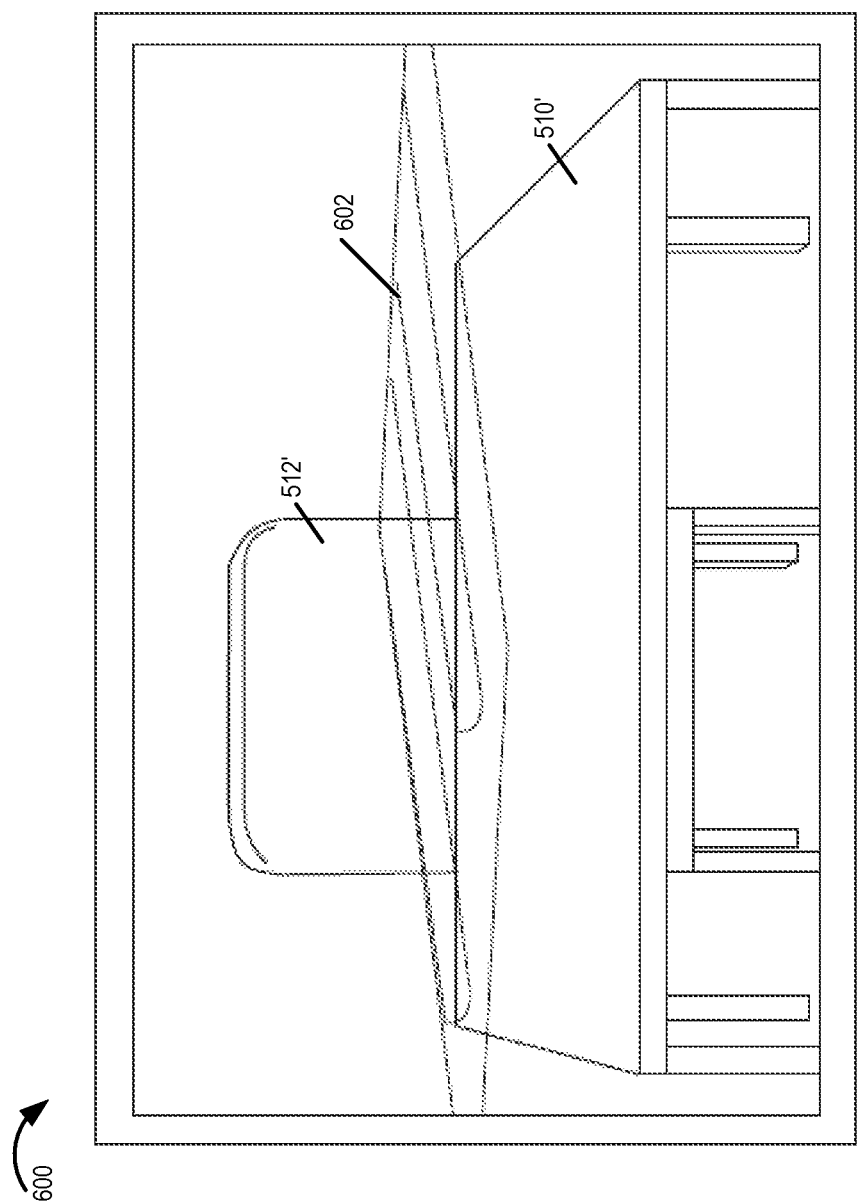
FIG. 6 illustrates an image of a scene of interest including the table and chair but with a ghost reflection from the light source also being present in the captured image thus showing the manifestation of the ghost image problem.

FIG. 6 illustrates an image 600 of the scene of interest including the table and chair shown in FIG. 5 captured by the camera device 502. FIG. 6 shows the manifestation of the ghost image problem in a captured image 600 as shown. As can be seen in the figure, while the captured image 600 includes the scene of interest with images 510' and 512' of the table and chair, an unwanted image 602 also referred to as ghost image is also formed. The ghost image is caused by the reflected stray light rays from the light source getting into the camera module and forming an undesired image of the light source. The formation of the ghost image 602 is highly undesirable and distorts the image of the desired scene of interest.

Figure 7:
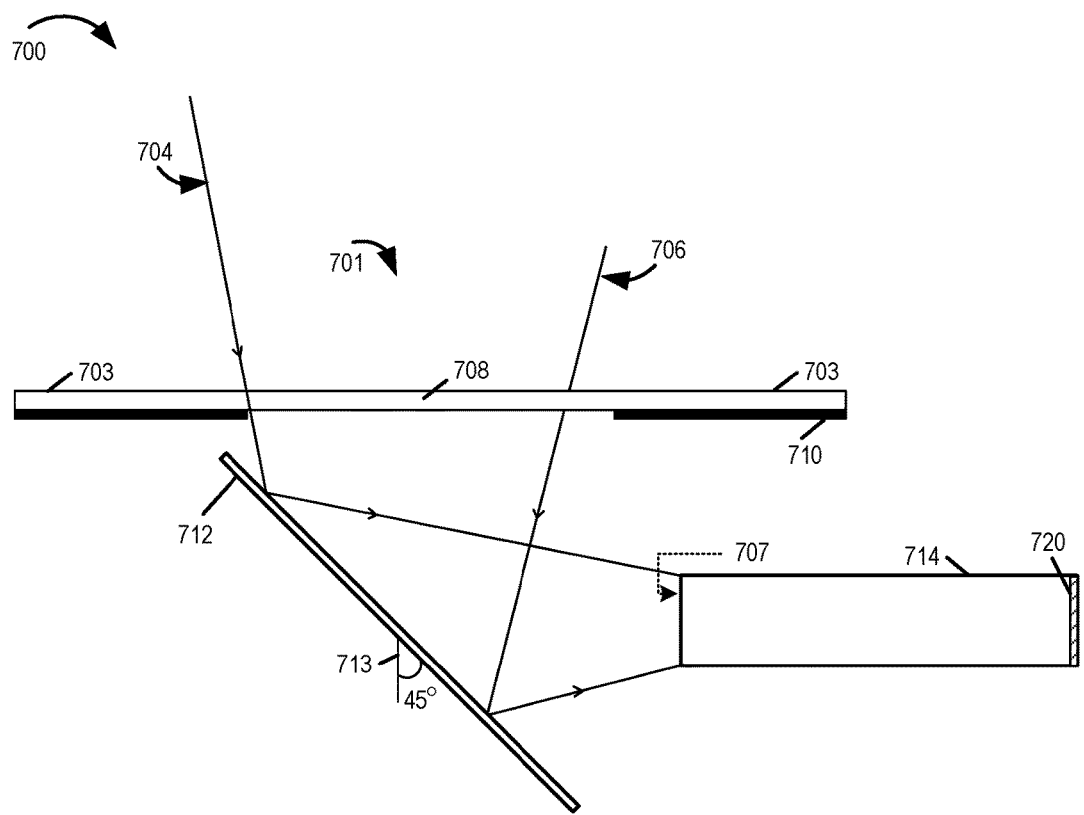
FIG. 7 illustrates an exemplary optical chain including a light redirection device used in an exemplary camera device where the light redirection device is arranged at an angle of 45°, in accordance with one embodiment.

FIG. 7 illustrates a drawing 700 illustrating an exemplary camera module and light reflecting element configuration of an optical chain 701 in an exemplary camera where the optical chain 701 includes a light reflecting element 712 arranged at an angle of 45° with respect to the face 707 of the camera module 714, in accordance with one embodiment. In some embodiments the light redirection element 712 is a plane mirror. FIG. 7 further shows the field of view (FOV) of the exemplary camera module 714. The lens face or face 707 of the camera module 714 is indicated in FIG. 7 by a broken line arrow that points to the front (e.g., face) via which the light rays reflected from the mirror 712 enter the camera module 714 and travel through one or more lenses therein. The face 707 of the camera module 714 is referenced just to facilitate an understanding of a reference with respect to which the angle of mirror 712 is determined. To simplify the illustration showing mirror angle with respect to the camera module face 707, which is considered the reference surface for the mirror angle, a flat vertical line 713 that runs parallel to the face 707 of the camera module 714 is shown. As can be seen the mirror 712 is set at 45° with respect to line 713.

The solid lines 704, 706 indicate the extreme boundary light rays at the boundary of the field of view. The light rays may be from a surface of an object/scene of interest. In the illustrated example the field of view is the region between the two solid lines 704, 706 and the light rays within the field of view, i.e., between and including the two solid lines 704, 706, make it to the camera module 714. The light rays enter via a portion 708 of the outer protective element, e.g., cover glass 703, supported on the chassis 710. The cover glass portion 708 serves as an outer protective element that protects the various inside elements, e.g., mirror, camera module lenses etc., and the portion 708 covers an opening on the face of the camera device 100/200 in which the camera module 714 and corresponding elements are located. The light rays enter via the opening over which cover glass portion 708 is placed. The light rays are incident on a reflecting element, e.g., such as the mirror 712 or a prism, and are reflected towards the camera module 714. The light rays reflected by the mirror 712 traverse through one or more elements, e.g., lens, filter etc., prior to reaching an image sensor 720 mounted on a flat mounting board on the back of the camera module 714. The light rays, e.g., light rays within and including the boundary rays 704, 708 corresponding to the field of view, from an object/scene of interest (which is in the desired field of view) enter the camera module 714 via the cover glass 708. These light rays are incident on the mirror 712 and are reflected towards the camera module 714. The reflected light rays pass through various elements including one or more lenses prior to reaching the sensor of the camera module 714.

Figure 8:
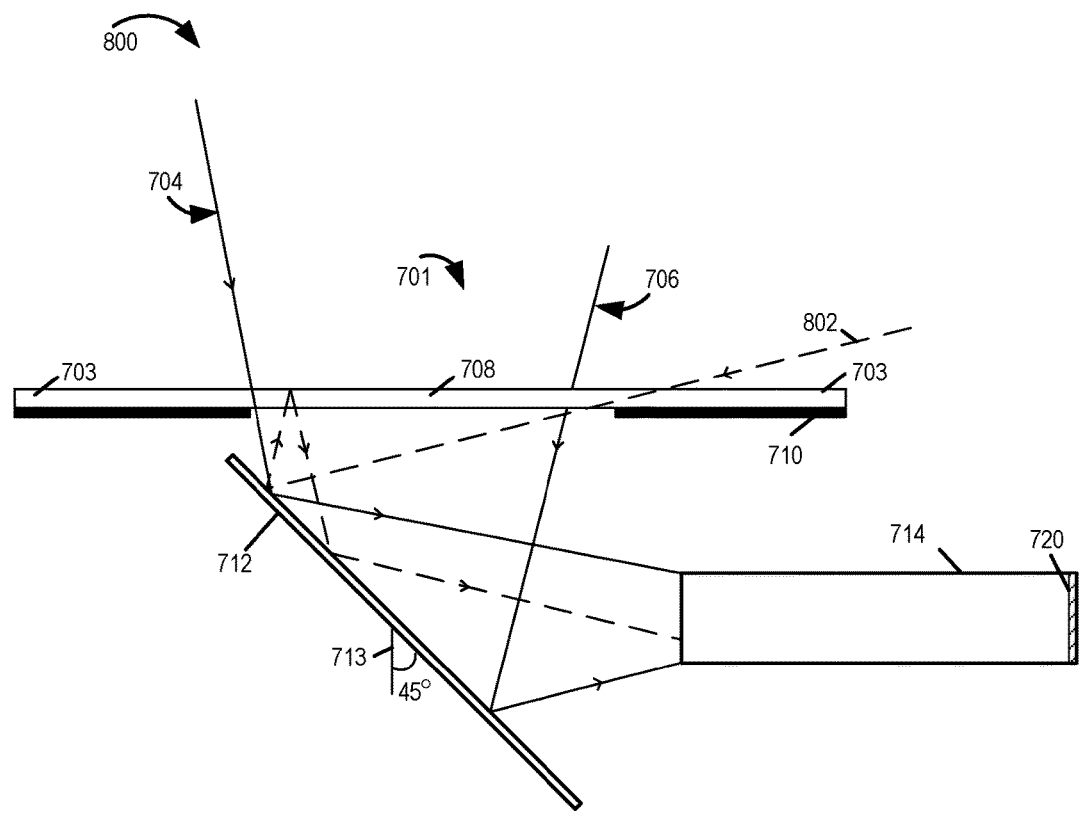
FIG. 8 illustrates a drawing showing a case where unwanted stray light ray(s) from a source, e.g., a high intensity light source, enter the camera module of FIG. 7 after undergoing reflections from the redirection device and an outer protective cover.

FIG. 8 illustrates a drawing 800 showing a case where unwanted stray light ray(s) 802 (jointly represented by the single line 802) from a source, e.g., such as the high intensity light source 508, enter the camera module 714 after undergoing reflections from the mirror 712 arranged at 45° and the cover glass 708 covering the opening via which light enters. As can be seen the unwanted stray light rays while being at off angles and outside the desired FOV boundary enter the camera module 714 in addition to the light rays within the desired FOV boundary 704, 706 and make their way to the camera module 714 and reach the image sensor therein. While the unwanted light rays 802 are outside the desired FOV, such stray light rays sometimes still manage to enter and hit the mirror 712 which is arranged at an angle of 45° with respect to the face of the camera module 714. As shown in FIG. 8 example, due to the angle at which the stray light ray(s) 902 hit the mirror 712 the stray light ray(s) 802 are reflected first towards the cover glass 708. Upon hitting the cover glass 708 the stray light rays 802 are reflected such that they travel towards the mirror 712 once again. In the second instance, upon reflection from the mirror 712 the unwanted stray light rays 902 enter the camera module 714. The unwanted stray light rays which bounce back into the camera module 714 and ultimately reach image sensor of the camera module 714 cause a ghost reflection/ghost image of the source 508 to be formed in a captured image. Such a ghost reflection/ghost image is illustrated in FIG. 6 as the ghost image 602 and discussed earlier. While 45° mirror arrangement for a camera module is desirable for a variety of reasons, however due to certain mirror angles such as 45° and owing to absence of an anti reflection coating on the cover glass 708 at times the stray light rays 802 are able to bounce back into the system and cause ghosting effect. Thus it is observed that while having the mirror set at 45° has many benefits, such mirror angles make it easier for the stray light rays to bounce into the camera module and form ghost images.

In some embodiments in order to restrict the stray light ray 802 from getting reflected back from the cover glass 708 surface, an anti reflective (AR) coating is used on the inside surface of the cover glass 708. The AR coating significantly reduces or diminishes back reflections of rays coming to the cover glass 708 from the mirror. Accordingly by coating the cover glass 708 surface with an AR material the chances of the stray light ray 802 getting to the image sensor of camera module 704 are significantly reduced or eliminated. In some embodiments an antireflective coating on both the inside and outside surface of the cover glass 708 is provided.

While not shown in FIG. 7-8 example for simplicity, the camera device, e.g., camera 100/200, including the optical chain 701 which includes camera module 714, mirror 712, and protective element 708 further includes a plurality of additional optical chains including similar corresponding elements but which may be arranged in the same or different manner in some embodiments. In some such embodiments the exemplary camera device includes a second optical chain including: i) a second outer protective element, e.g., cover glass, which does not include an antireflective coating on the outside surface of the second outer protective element. Similar to the outer protective element 708, the second outer protective element may be lens or a cover through which light can pass to a second sensor in the second camera module. In some embodiments the second optical chain does not include a light redirection device. In some embodiments the second outer protective element is a flat piece of glass including a hole which is an opening through which light can pass into the second optical chain.

Figure 9:
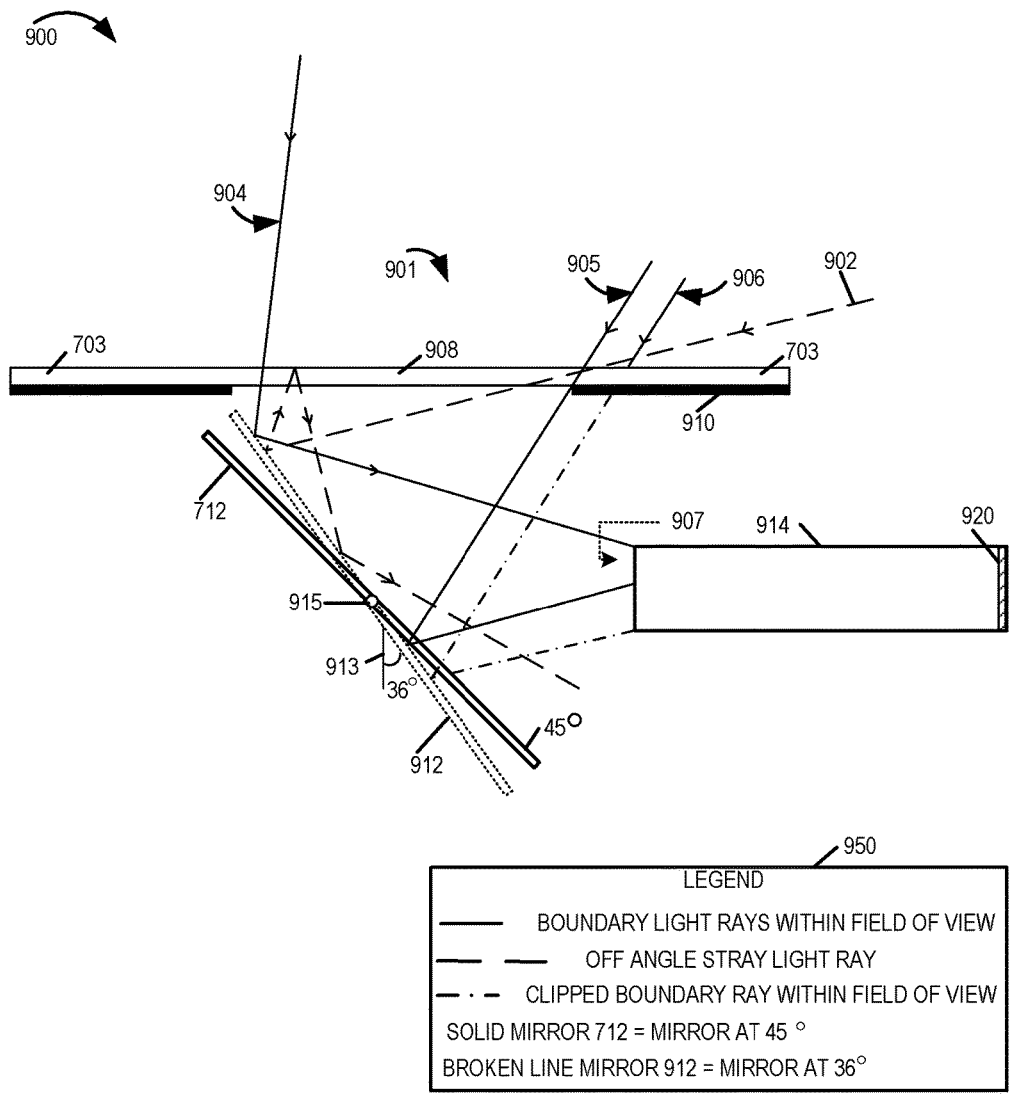
FIG. 9 illustrates another exemplary optical chain including a light redirection device configuration used in an exemplary camera device where the light redirection device is arranged at an angle of 36° showing how light rays within desired field of view and off angle stray lights rays are redirected in some embodiments.

FIG. 9 is a drawing 900 illustrating an exemplary camera module 914 and mirror configuration in an optical chain 901 in an exemplary embodiment where a mirror 912, used as a reflecting device, is arranged at an angle within a specific range of angles that redirects stray light rays away from the camera mode 914 thereby disallowing and/or reducing the likelihood of formation of ghost image of the light source. The exemplary arrangement of elements of the optical chain 901 shown in drawing 900 may be used in any of the camera devices of the present invention shown in other figures, e.g., camera devices 100, 200. The camera device 100/200 may include some optical chains with the configuration and elements arrangement such as shown in FIG. 9 while additional optical chains may have similar or different arrangements. A light reflecting element, such as the mirror 912, set at specific mirror angles in accordance with the invention is found to greatly reduce and/or eliminate stray light reflections which cause formation of ghost image. A smaller angle of the mirror 912 surface with respect to the face 907 of camera module 914 reduces the chances of stray light rays getting into the camera module 714 while larger angles between the mirror 912 and the face 907 of camera module 914 increase the likelihood of stray light rays bouncing into the camera module 914 and forming ghost image.

To achieve the camera configuration illustrated in FIG. 9 the mirror 912 is set at about a 36° angle with respect to the front face of the camera module 714. That is, to achieve the mirror configuration of FIG. 9 in comparison to the mirror angle shown in FIGS. 7-8, the mirror is rotated inwards, e.g., to change the angle from 45° to about 36°. While the mirror angle is shown to be 36° in the example of FIG. 9, other angles less than 45°, e.g., between 36° and 45°, may also be used in some embodiments. To change the angle of a mirror with respect to the front face of the camera module 714 from a default 45° angle to 36° angle, the mirror in some embodiments is rotated in a direction so that the mirror becomes steeper rather than flat with respect to the surface of the camera where camera module 914 is located, e.g., rotating the mirror inwards. As the mirror angle is changed, the mirror 712 becomes steeper in comparison to arrangement shown in FIGS. 7-8 and discussed earlier. The exterior solid lines 904, 906 indicate the extreme boundary light rays within the field of view. While in the example of FIG. 9 the desired FOV is the region between the exterior solid lines 904, 906, all the light rays within the FOV do not make their way to the mirror 912 and the camera module 914. As shown the boundary rays 906 within the FOV are clipped due to being blocked by the camera surface and unable to reach the mirror 912 while light rays within and including the boundary rays 904, 905 are able to enter via the outer protective element, e.g., cover glass portion 908. The light rays enter via an opening covered by the cover glass portion 908 which the additional cover glass portion 703 extending beyond the opening may be supported by the chassis 910. The light rays 904, 905 are incident on the mirror 912 set at 36° angle and are reflected towards the camera module 914 as shown. The light rays reflected by the mirror 912 traverse through one or more elements, e.g., lens, filter etc., prior to reaching an image sensor 920 mounted on a flat mounting board on the back of the camera module 914. As can be noted in the configuration shown in FIG. 9 the outer protective element, i.e., the cover glass 908, is flat relative to the face of the camera device which is indicated by arrow 1227.

FIG. 9 further illustrates how unwanted stray light rays 902 (jointly represented by line 902) from a source, e.g., such as the light source 508, while managing to get through the cover glass portion 908 and reaching the mirror 912, are bounced off such that they are unable to make their way into the optical system, e.g., unable to enter the camera module 914. As can be seen the stray light rays 902 enter via the opening covered by cover glass portion 908 and hit the mirror 912, however due to the arrangement of mirror 912 at about 36° the stray light rays are first reflected such that they hit the cover glass 908 surface and are then reflected away from the camera module 914 thereby avoiding the formation of a ghost image. As can be appreciated from the figure, owing to the mirror arrangement at a specific angle the stray light rays 902 reflected back from the cover glass 908 inner surface are directed away from the camera module 914 and fail to make it to the image sensor. It is observed that choosing the mirror angle appropriately between a specific range helps in avoiding the entry of stray light rays in to the camera module and thus avoiding the ghost image formation. A smaller mirror angle with respect to the lens face or face of the camera module 914 (e.g., line 913 runs parallel to the face of the camera module 914) reduces the ghost image formation since such angles allow reflecting off angle stray light rays 902 away from the camera module 914. On the other hand a larger mirror angle with respect to the lens face or face of the camera module 714, e.g., 54°, increases the likelihood of ghost image formation since such angles make it easier for stray light rays to enter the camera module 914.

Such a mirror configuration and/or arrangement at desired specific angles with respect to the camera module face/lens face can be achieved in a variety of ways. One such configuration is shown in FIG. 9 example where the mirror 912 is supported by a pivot 915, e.g., hinge, that allows the mirror 912 to be rotated around the hinge 915. In the exemplary embodiment illustrated in FIG. 9 the position of the hinge 915 is close to the center of the mirror 912. By rotating the mirror around the hinge 915 the mirror angle with respect to the front face of the camera module 914 is controlled, e.g., changed or set to a desired angle. For example the mirror angle may be changed from a 45° angle (such as shown in FIGS. 7-8) to a smaller angle that allows for avoiding stray light rays getting into the camera module 914. In the illustrated configuration the mirror 912 angle is set to 36° while the original default angle and position of mirror 712 at 45° is shown for better appreciation of the change in mirror 912 angle relative to the 45° angle.

While such a configuration with the hinge 915 positioned close to the center of the mirror 912 facilitates easy rotation of the mirror 912 to achieve the desired angle, e.g., 36°, thereby reducing the likelihood of stray light rays reaching the image sensor of camera modules 914, however in this configuration at least some light rays within the desired field of view get clipped/vignetted by the camera surface and/or lens barrel assembly of camera module 914. Thus in some instances light rays from a region of interest within the field of view may get clipped and would not reach the camera module 914. The desired FOV of camera module 914 in the configuration shown in FIG. 9 is the region between the exterior solid lines 904, 906 representing the boundary light rays within the normal field of view. The clipped/vignetted rays include the light rays shown to the right of light ray 905 which is the boundary ray within the field of view which gets through the opening via cover glass portion 908. Thus in the illustrated configuration the effective field of view of the camera module 914 is somewhat reduced and include the light rays within and including the boundary rays 1004, 1005. Box 950 provides a legend to facilitate understanding of drawing 900 and includes information indicating that solid lines are used to represent light rays 904, 905, 906, long broken lines are used to represent unwanted stray light rays and broken line with dots is used to represent clipped portion of a light ray. In some embodiments the outer surface of the protective cover glass 908 is not coated with an anti reflective coating. In some embodiments the inner surface of the protective cover glass 908 is coated with an anti reflective coating.

Figure 10:
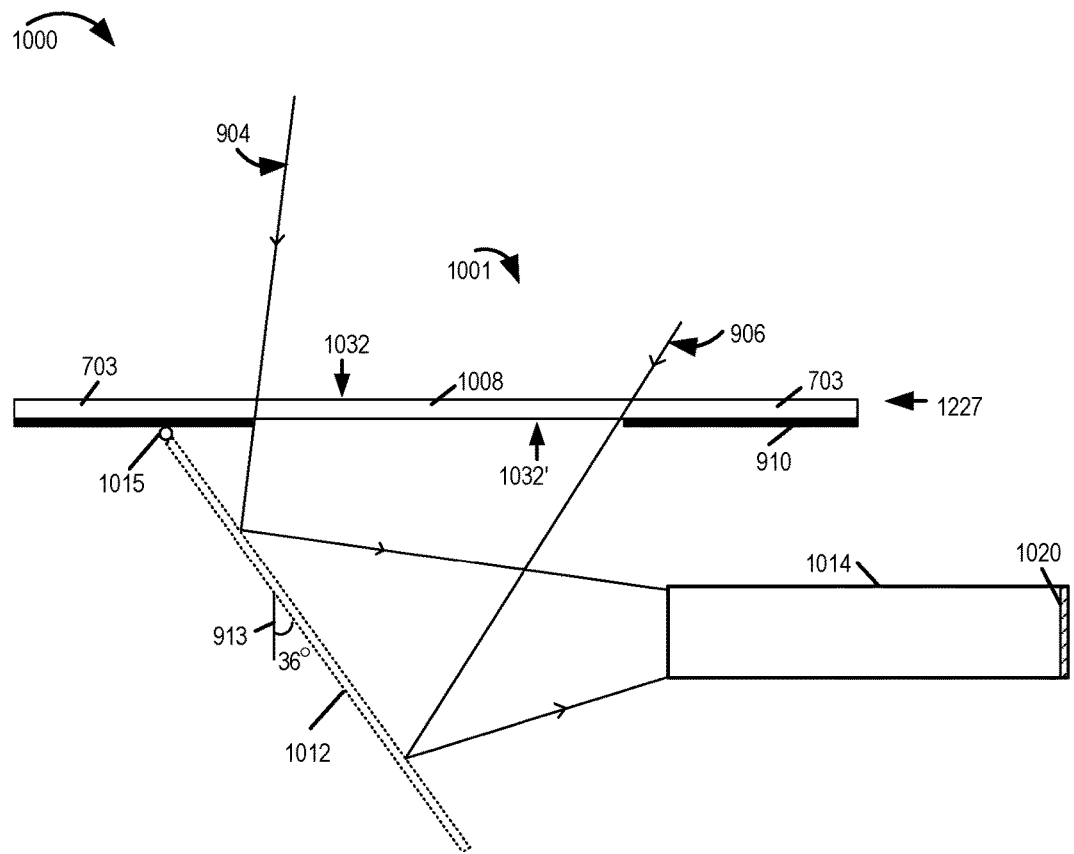
FIG. 10 illustrates yet another exemplary configuration of an optical chain including a mirror in a camera device which results in positioning of the mirror at an angle of 36° and overcomes or significantly reduces or avoids the clipping/vignetting of light rays that may be caused by the mirror configuration shown in FIG. 9.

FIG. 10 illustrates a drawing 1000 showing another exemplary configuration of a camera module 1014 and corresponding light redirection element, e.g., mirror 1012, in another optical chain 1001 in the camera device 100/200 which results in achieving the desired mirror angle to reduce ghosting effect and which overcomes or significantly reduces the clipping/vignetting of light rays caused by the mirror arrangement shown in FIG. 9. In the FIG. 10 embodiment the mirror 1012 is supported by a hinge 1015 positioned at the top, e.g., at the top edge of the mirror 1012. The hinge 1015 allows mirror 1012 to be rotated around the hinge 1015. By rotating the mirror about the hinge 1015 at the top, the mirror 1012 can be set at desired angles with respect to the front face of the camera module 1014. Thus it should be appreciated that FIG. 10 configuration with the hinge 1015 positioned at the top facilitates easy rotation of the mirror 1012 to achieve the desired angle, e.g., 36°, thereby reducing the likelihood of stray light rays reaching the image sensor 1020 of camera module 1014. The positioning of hinge 1015 close to the top edge of the mirror 1012 for controlling the mirror rotation also eliminates or significantly reduces the clipping/vignetting of desired light rays within the field of view which was shown in FIG. 9 example. As can be noted in the configuration shown in FIG. 10 the outer protective element, i.e., the cover glass portion 703 extending beyond the opening as well as cover glass portion 1008 covering the opening through which light enters, is flat relative to the face of the camera device which is indicated by arrow 1227. In some embodiments the outer surface 1032 of the protective element 1008 is not coated with an antireflective coating. In some embodiments the inside surface 1032' is coated with an antireflective coating. In some embodiments neither the outer surface 1032 nor the inside surface 1032' of cover glass 1008 is coated with an antireflective coating.

Figure 11:
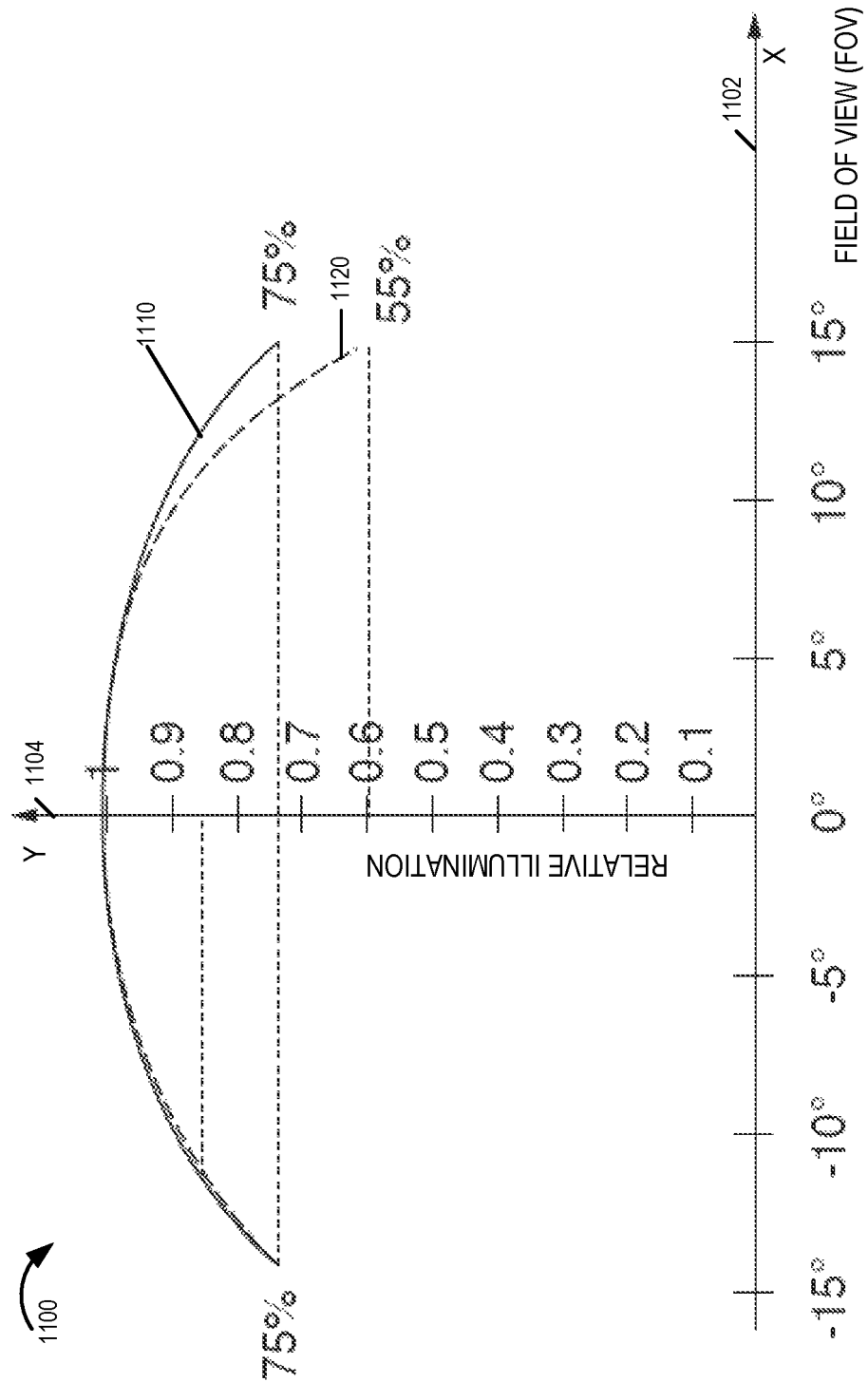
FIG. 11 illustrates an exemplary relative illumination plot or the vignetting curve across a field of view (FOV).

FIG. 11 illustrates an exemplary relative illumination plot 1100 or the vignetting curve across a field of view (FOV). In the plot 1100 the relative illumination is indicated on the Y axis 1104 while the range of the field of view used to plot the curve is indicated on the X-axis 1102. The first (top) plot 1110 shown by a solid curved line indicates the relative illumination over the given range of FOV without clipping of light rays, e.g., when there is no clipping/vignetting of light rays due to blocking of light rays by the lens barrel assembly of the camera module and/or camera surface. The second plot 1120 shown by a broken/dashed curved line indicates the relative illumination across the given range of FOV with clipping of light rays, e.g., when light rays are clipped by the camera face surface and/or lens barrel assembly of the camera module. As can be appreciated from the illustrated curves 1110 and 1120 the relative illumination is lower for some parts of the filed of view for the second curve where clipping of light rays occurs.

Figure 12:
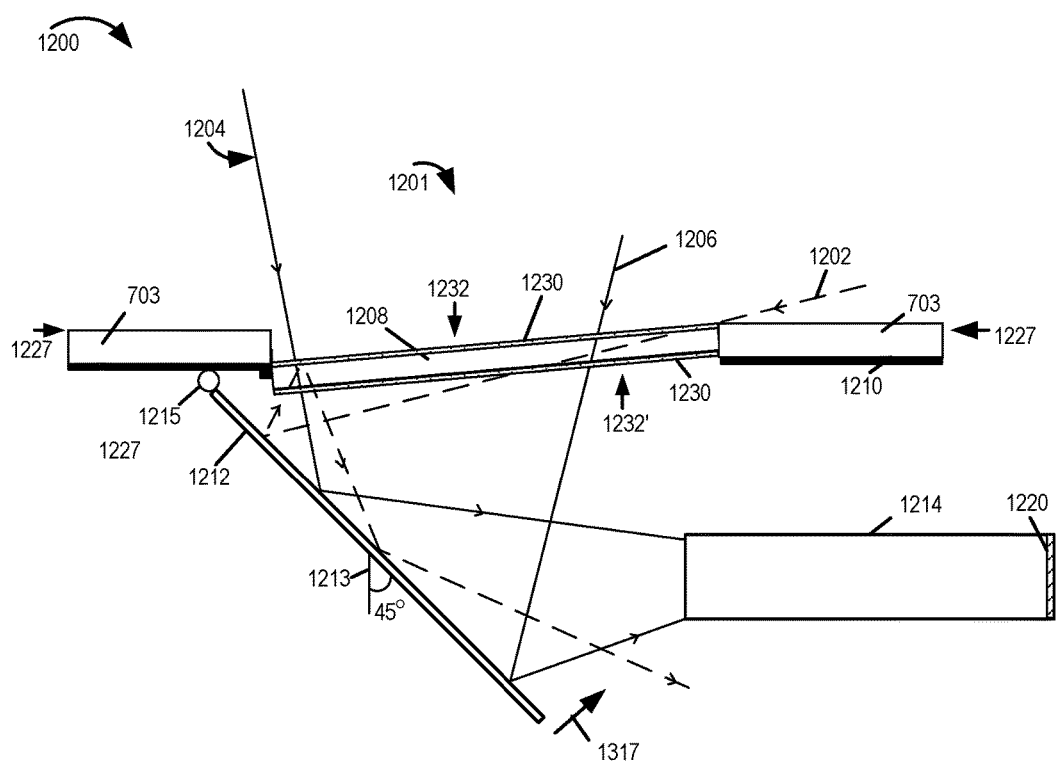
FIG. 12 illustrates an exemplary configuration of an outer protective cover, light redirection element and the camera module of an optical chain in an exemplary camera device in accordance with one embodiment where the protective cover is recessed inside the front surface of the camera device and sloped at an angle.

FIG. 12 is a drawing 1200 illustrating an exemplary configuration of a light redirection element 1212 and an exemplary camera module 1214 of an optical chain 1201 in a camera device, e.g., camera device 100/200, with a portion of an outer protective element, e.g., cover glass, of the optical chain 1201 being tilted relative to the face of the camera device in accordance with one embodiment. The exemplary configuration of various elements illustrated in FIG. 12 embodiment provides many benefits and addresses the limitations of other configurations. FIG. 12 configuration eliminates or greatly reduces the ghosting effect by reflected stray light rays away from the camera module 1214 and thereby preventing it from reaching the sensor 1220 of the camera module 1214.

In the exemplary configuration of FIG. 12 a portion 1208 of the protective cover glass 1203 via which the lights rays enter is partially recessed inside the camera and sloped e.g., tilted, at an angle relative to the outer surface of the camera or the face of the camera indicated by arrow 1227. Thus face 1227 illustrative in the figure indicates the face of the camera devices shown in various figures, e.g., such as camera device 100/200. As can be appreciated the face of the camera is parallel to the chassis 1210. The face 1227 of the camera corresponds to the outer surface of the cover glass 1203. In this configuration with the recessed cover glass portion 1208 tilted at an angle relative to the face of the camera and extending at least partially below the surface of the face 1227 of the camera, the off angle stray light rays 1202 are reflected back from the tilted cover glass 1208 such that upon hitting the mirror 1212 in second instance they are redirected away from the camera module 1214, e.g., reflected outside the maximum field angle of the first lens of the camera module 1214. As can be appreciated from FIG. 12 the illustrated configuration does not even require mirror 1212 angle to be changed from the 45° angle position while it still addresses the ghost image problem with the tilted cover glass 1208 arrangement. While using the mirror 1212 at 45° is an option, other mirror angles including those achieved by inward rotation of the mirror, e.g., 36°, can be and sometimes are used in some embodiments with the same or similar benefits of avoiding ghost image formation.

In some embodiments the cover glass 1208 is coated with an anti-reflective coating 1230 on an inside surface 1232' of the cover glass 1208. In some embodiments the cover glass 1208 is coated with an anti-reflective coating 1230 on both an inside surface 1232' and an outside surface 1232. However in other embodiments only the inside surface 1232' is covered and in still other embodiments no AR coating 1230 is used on either surface. In some embodiments light redirection device, e.g., mirror 1212, includes or is coupled to a pivot 1215 in close proximity to the inside surface of the camera face 1227, e.g., by the chassis 1210 surface which is parallel to the face 1227 in some embodiments. In some embodiments the pivot 1215 is a hinge located at one end of the light redirection device 1212 rather than in the middle of the light redirection device. In some embodiments the pivot 1215 is located at one end of the light redirection device as illustrated rather than in the middle of the light redirection device. In some embodiments the mirror 1212 is configured to support a range of angles in a range between 0 and 47 degrees. In some embodiments the mirror 1212 is configured to support a range of light redirection device angles in the range of 30 to 46 degrees. In some embodiments the mirror 1212 is configured to support a range of light redirection device angles in the range of 40 degrees to an angle which is less than 46 degrees. In some embodiments the camera devices of the present invention uses a plurality of optical chains where at least some optical chain elements, e.g., mirror, outer protective cover, camera module etc. are arranged in the manner shown, e.g., in FIG. 10, while some other optical chains and corresponding elements such as mirror, cover glass etc., are arranged in the manner shown in FIG. 12.

In accordance with one aspect the amount of tilt angle, e.g., the angle of the cover glass portion 1208 with respect to the camera face surface/outer surface of cover glass 1203 of the camera, to be used depends on the effective focal length and/or field of view of the given camera module to which the tilted cover glass 1208 corresponds. It should be appreciated that the FOV of the camera module is the same as the FOV of the optical chain in which the camera module is included.

In accordance with one aspect a protective cover element corresponding to an optical chain having larger FOV, e.g., such as the optical chains with smaller focal lengths, e.g., 70 mm, is tilted at a larger angle with respect to the camera front surface 1203 while a cover glass corresponding to an optical chain having smaller FOV, e.g., such as the optical chains with larger focal lengths, e.g., 150 mm, is tilted at a smaller angle with respect to the camera face surface or face 1227. In accordance with the features of some embodiments the tilt angle for a cover glass corresponding to a given optical chain is calculated using the following equation:

Cover Glass Tilt=Half Field of View (FOV) of the Camera Module/3

In some embodiments the tilt angle for cover glass corresponding to the 70 mm optical chains is approximately 6° with respect to the camera face surface 1227 and is calculated using the above equation in the following manner:

70 mm Camera Module FOV=34.4 degrees
Half FOV=34.4/2=17.2
Cover Glass Tilt Angle=Half FOV/3=17.2/3=5.73 degrees Similarly in some embodiments the tilt angle for cover glass corresponding to the 150 mm optical chains is approximately 3° with respect to the camera face 1227 surface and is calculated using the above equation in the following manner:

150 mm Camera Module FOV=16.4 degrees
Half FOV=16.4/2=8.2
Cover Glass Tilt Angle=Half FOV/3=8.2/3=2.73 degrees It should be appreciated that while a camera module such as camera module 1214 is included in the optical chain 1201 with other elements such as the mirror 1212 and protective cover 1208, the FOV of the camera module 1214 is the same as the FOV of the optical chain 1201.

In some but not necessarily all embodiments, optical chains with mirrors have titled cover glass portions over the aperture corresponding to the light entry area of the corresponding optical chain including the mirror. Optical chains without mirrors normally, and in some embodiments, do not have titled cover glasses. As discussed above the amount of tilt of the cover glass depends, in some embodiments on the focal length of the optical chain over which the cover glass is placed.

In some embodiments in addition or as an alternative to using the above configuration of elements such as the outer protective element, e.g., cover glass, tilted at specific angles, other useful techniques are employed to reduce and/or eliminate the ghosting problems. For example in some embodiments the outer protective element has double sided anti reflection (AR) coating with both an inside surface and outside surface of the cover glass being coated with anti reflective material. Since the cover glass 1208 is recessed into the camera housing the AR coating is well protected from scratches, dents and nicks which may otherwise be difficult to avoid. In other cases the AR coating, if used, over the cover glass is destroyed easily because of lack of protection of the cover glass surface from scratches and dents since the cover glass itself forms the outer most protective cover layer.

Figure 13:
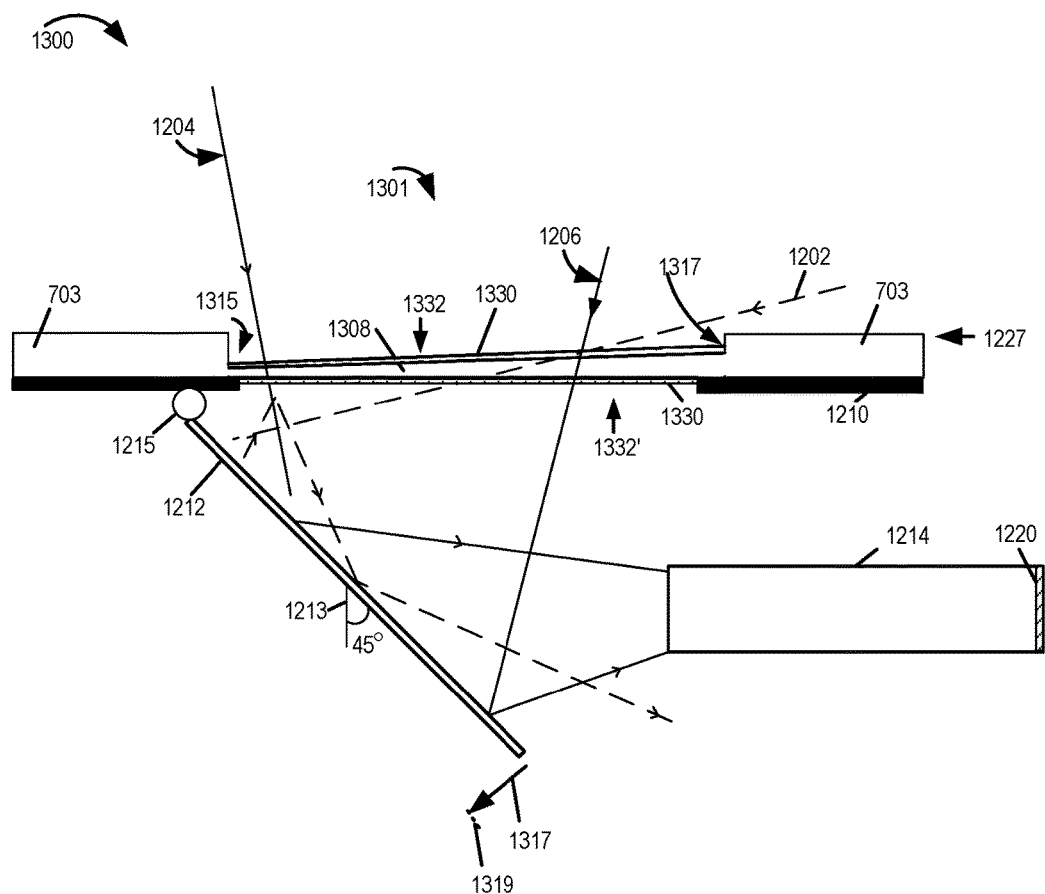
FIG. 13 illustrates another exemplary arrangement of an optical chain and its corresponding elements where the protective cover portion is sloped and integrated into a cover glass.

FIG. 13 illustrates a camera module arrangement 1300 in an optical chain 1301 similar to the one shown in FIG. 12 but with some additional features shown. FIG. 13 is a cross sectional view showing the portion of the cover glass 703 and outer protective element 1308 which is part of the cover glass 703 corresponding to the optical chain 1301 which includes mirror 1212. While the outer protective element 1308 is in some embodiments sloped with a flat surface, in other embodiments is sloped and curved acting as a lens. Thus it should be appreciated that the protective element over optical chains can be a lens or simply a protective element such as piece of flat glass arranged so that it is sloped. While in some embodiments the protective element varies in thickness in other embodiments the thickness is uniform as shown in FIG. 12 where protective element 1208 if of uniform thinness and may be part of the cover glass 703.

In the FIG. 13 embodiment the protective portion 1308 which protects and seals the optical chain from dirt, is sloped on its top surface and flat on its bottom surface. The bottom surface of the cover glass is coated with antireflective coating 1330 as is the top surface of the protective portion 1308. The AR coating 1330 is optional and not used in all embodiments. Reference 1332 is used to identify the top surface of the antireflective coating 1330 on the top side of the cover glass while reference 1332' is used to indicate the surface of the antireflective coating closest to the mirror 1212. In some embodiments the reflective coating is omitted from one or both of the surfaces of the protective element portion 1308. In most but not necessarily all embodiment the antireflective coating is included on at least the inner surface of the cover glass 703 in the FIG. 13 embodiment. In the FIG. 13 embodiment both the left and right sides of the tapered output protective element 1308 are recessed below the outermost surface 1227 of the cover glass 703. This reduces the risk of the antireflective coating 1330 over the aperture of the camera module 1301 being scratched. Due to the tapper the left side of the protective element 1308 is recessed more than the right side of the protective element 1308. The surface of the protective element 1308 is smooth and flat but at an angle relative to the outer surface 1227 of the cover glass 703 which corresponds to the surface of the camera face. While both side of the protective element 1308 are shown as being recessed, in some embodiments only one side, e.g., the side closest the hinge 1215 is recessed.

Given that at least a portion of the cover glass 703 corresponding to the protective element portion 1308 is recessed, as a user swipes the face of the camera or wipes the protective element 1308, dirt on the area may be pushed to the side and difficult to remove. To provide dirt catch areas 1315, 1317 the protective portion 1308 is made intentionally larger than the opening through which light passes through the mounting surface 1210 towards mirror 1212. As a user swipes or wipes the tapered portion of the cover glass 1308 dirt will be pushed to the side and even if remaining the recessed area of the cover glass 703 is unlikely in many cases to block light entering the opening in the chassis 1210 and passing into module 1214. Thus the large recessed area provides advantages over keeping the recess to the same or nearly same size as the opening in camera module mounting surface 1210 to which the mirror 1212 may be secured by hinge 1215 and to which camera module 1214 may be secured.

Note that in FIGS. 12 and 13 and in various other embodiments the mirror 1212 and/or other mirror of the camera module may move between a position at or less than 45 degrees to a 36 degree or other lesser degree position. This may involve the mirror being titled out away from the mounting surface 1210 with the edge of the mirror moving between the position shown in FIG. 13 in the direction of arrow 1317 to position 1319.

While 45 degree and 36 degree mirror positions are shown, in some embodiments the mirror is constrained to positions less than 45 degrees, e.g., 44 degrees or less.

Thus, in at least some embodiments the portion of the cover glass over the opening corresponding to modules which include mirrors is tilted. In at least some each embodiments the mirror pivot is at or near the surface, e.g., mounting surface or chassis, to which the mirror is mounted. In some but not necessarily all embodiments while mirror movement is supported mirror now rotates such that the angle is always less than 45 degrees.

Elements in FIG. 13 which are the same or similar to those in FIG. 12 are identified using the same reference numbers and will not be described again in detail. In some embodiments the outer cover glass surface of the camera device is machined or manufactured with the tilt for one or more optical chain module openings integrated into the sheet of glass. A cross section of an area of the cover glass corresponding to one of the camera modules including a mirror of a camera device such as that shown in FIG. 1 is shown in FIG. 13. For modules with elements which are to have a tilted protective element at least the outside of surface of the protective element, e.g., portion of the cover glass covering the aperture of the optical chain through which light is to enter, is sloped. The FIG. 13 embodiment differs from the FIG. 12 embodiment in that the output protective element, e.g., tilted cover glass, is machined and/or manufactured with a dirt catch area and is shown with the slope in the outer surface but not the inner surface.

Figure 14:
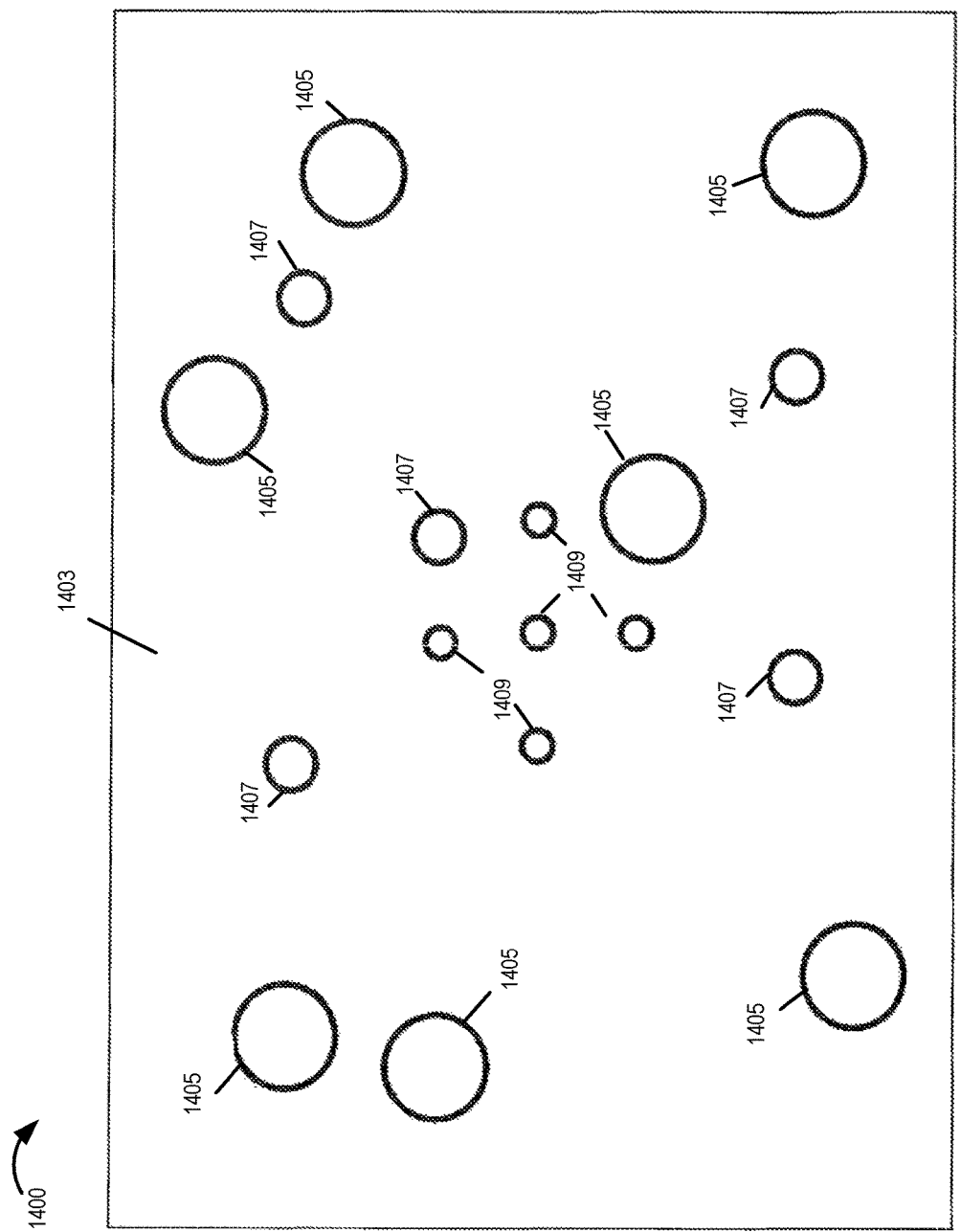
FIG. 14 is a front view of a camera device showing a cover glass and the corresponding protective cover portions protecting the apertures of multiple optical chains of various sizes that are included in the camera device.

FIG. 14 is a front view 1400 of a camera device showing a cover glass 1403 and the corresponding protective cover portions protecting the apertures of multiple optical chains of various sizes that are included in the camera device. Cover glass 1403 may be and sometimes is used as the cover glass 703 shown in the other figures. Cover glass portions covering apertures of corresponding to optical chains having the largest focal length and which include mirrors are identified by the reference number 1405. These protective areas are sloped, e.g., as shown in FIG. 12 or 13. In some embodiments the slope is achieved by tapering the protective area as shown in FIG. 13. In such an embodiment, the circular portion corresponding to protective area 1405 will have a flat surface but will be recessed on one side more than the other side due to the slope of the protective cover glass portion. In fact, one side of the cover glass portion 1405 may be flush with the flat portion of the cover glass 1403.

The protective portions 1407 of the cover glass over the optical chains with intermediate focal lengths and mirrors will also be sloped in some embodiments. The slope of protective portions 1407 is the same or different from the slope used for the protective portions 1405 over the optical chains with larger focal lengths. The optical chains with the smallest focal lengths have the smallest openings in the face of the camera device and have protective portions 1407 covering the apertures of the optical chains. Thus in at least some embodiments the cover glass 1403 covers the openings of multiple optical chains with different focal lengths with the optical chains with mirror being covered by sloped portions of the cover glass 1403 and optical chains without mirrors being covered by flat portions of the cover glass 1403. In some embodiments the cover glass 1403 is coated on the exterior and/or interior with an antireflective coating. In some embodiments the reflective coating covers the entire cover glass on one or both sides.

In some embodiment the inner surface of the cover glass 1403 is coated with an anti-reflective coating but not the outer surface where scratches are more likely to occur. In other embodiments the reflective coating is on the exterior of the cover glass portion corresponding to optical chains with mirrors but not on the exterior protective portion of the cover glass corresponding to camera modules which do not include mirrors. This may be the case where scratches on the exterior surface of optical chains with protective portions which are not recessed are of concern while scratches to the protective portions of optical chains with tilted protective surfaces are of less concern since all or a portion of the protective portion of the cover glass corresponding to such optical chains will be at least partially recessed from the front outermost surface of the cover glass 1403.

Thus, depending on the embodiment all or a portion of the outer cover glass 1403 may be covered with an anti-reflective coating but in some embodiments no coating is placed on the outer surface of the cover glass 1403.

The various mirrors, camera module and/or cover glass arrangements and configurations illustrated in FIGS. 7-10 and 12-13 and discussed above can be used in the camera device 100 and/or 200 of the present invention. Each of the camera modules shown in FIGS. 7-10 and 12 include one or more lenses, filter and an image sensor which perform the same functions as discussed with regard to these elements in the discussion of FIGS. 1-4. While in various figures the mirror, camera module and/or cover glass arrangements and configurations are shown for a single camera module for simplicity, it should be appreciated that a camera device of the present invention may and in some embodiments does include multiple optical chains, e.g., camera modules, and thus a plurality of camera modules and corresponding reflecting elements such as the mirror may be arranged in the illustrated manner in a given camera device. For example in a camera device implemented in accordance with the features of the present invention while some elements, e.g., camera modules and corresponding mirrors may be arranged in the manner shown in FIG. 7-8 with the mirror being at 45° angle, some other camera modules and corresponding mirrors may be arranged in the manner shown in FIG. 9-10. Still in some embodiments a camera device may include various elements arranged in the manner illustrated in FIG. 12 and discussed above where a cover glass portion itself is sloped and extends partially below the outer surface of the camera. In some embodiments the camera device includes a plurality of optical chains having different focal lengths. In some such embodiments a first optical chain and corresponding elements such as the mirror and outer protective element, e.g., cover glass, are arranged in the manner shown in FIG. 12, e.g., with the cover glass portion 1208 sloped relative to the face 1227 of the camera device and extending at least partially below the surface of the face 1227 of the face of the camera. The outer surface of cover glass 1203 corresponds to the surface of the face 1227 of the camera. In some such embodiments the camera further includes a second optical chain having a shorter focal length than the first optical chain and including a second outer protective element, e.g., cover glass, which is positioned flat relative to the face 1227 of the camera device, e.g., such as shown in FIGS. 9-10.

Various approaches used to reduce and/or avoid formation of ghost images in accordance with the invention are discussed below:

1) Using Custom 2-Sided AR (Anti-Reflection) Coating of Cover Glass:

In accordance with one aspect of some embodiments, anti-reflection coating on both sides of the cover glass with reflectance as low as, e.g., 0.3% is used. This mitigates and reduces the visibility of the ghost reflection in a captured image. While with the anti reflection coating approach the ghost reflections are reduced there may be some disadvantages, such as:

i) For a camera which will be handled like a cell phone, one can expect the front/outer side of the cover glass to be exposed to the environment, fingers, keys (in a pocket), etc., which would scratch any such AR coating rendering it ineffective.

ii) AR coatings only mitigate and reduce the visibility of the ghost reflection. They do not completely eliminate the problem.

2) Mirror Rotation

In accordance with another aspect, different specific mirror angles are used to avoid ghost reflection as shown in various Figures, e.g., FIGS. 9-10, discussed above.

3) Tilt Cover Glass

In accordance with another aspect the cover glass via which the light enters is tilted. FIG. 12 illustrates such a configuration where the cover glass is tilted. This greatly reduces or eliminates the ghost reflection in some embodiments. The example configuration of FIG. 12 shows how the effect of unwanted ghost reflections is minimized and/or eliminated completely by changing the tilt angle of the cover glass above the mirror. Even if light reflects back from the cover glass it does not bounce back in the camera module within the angle of the lens field of view (FOV) and thus does not reach the image sensor.

This approach can additionally be combined with double sided AR coating on the cover glass because the cover glass is depressed into the device in some such embodiments. This approach can also be combined with inward, e.g., clockwise, mirror rotation approach which is illustrated in FIGS. 9-10.

An exemplary camera device (100, 200) in accordance with one embodiment comprises: a first optical chain (1201) including: a first outer protective element (1208) sloped relative to a face (1227) of said camera device and extending at least partially below the surface of said face (1227) of said camera device, said outer protective element (1208) being a first lens or cover through which light can pass; a light redirection device (1212); and a sensor (1220).

In some embodiments the first outer protective element (1208) is coated with an anti-reflective coating (1230) on an inside surface (1232') of said first outer protective element (1208). In some embodiments the first outer protective element (1208) is coated with an anti-reflective (1230) coating on both an inside surface (1232') and an outside surface (1232).

In some embodiments the light redirection device (1212) includes a pivot (1215) in close proximity to the inside surface of said camera face (1208). In some embodiments the pivot (1215) is a hinge located at one end of the light redirection device (1212) rather than in the middle of the light redirection device (1212). In some embodiments the pivot (1215) is located at one end of the light redirection device (1212) rather than in the middle of the light redirection device (1212).

In some embodiments the light redirection device (1212) is configured to support a range of light redirection device angles in a range between 0 and 47 degrees. In some embodiments the redirection device (1212) is configured to support a range of light redirection device angles in the range of 30 to 46 degrees. In some embodiments the redirection device (1212) is configured to support a range of light redirection device angles in the range of 40 degrees to an angle which is less than 46 degrees. In some embodiments the camera device (100, 200) includes a plurality of optical chains having different focal lengths. In some embodiments the first optical chain (1201) has a focal length which is the largest of any of the optical chains included in said camera device. In some embodiments the camera device includes a second optical chain (1001), said second optical chain (1001) having a shorter focal length than said first optical chain (1201) and including a second outer protective element (1008) which is flat relative to the face (1227) of said camera device. In some embodiments the first outer protective element (1208) is a tapered area of a flat glass cover plate (703), said tapered area corresponding to an aperture of the first optical chain (1201), said flat glass cover plate (703) not being tapered over an aperture of the second optical chain (1001). In some embodiments the outer surface (1032) of said second protective element (1008) is not coated with an antireflective coating. The camera device of claim 6, wherein said light redirection device is configured to support a range of light redirection device angles in a range between 0 and 47 degrees.

In some embodiments the light redirection device is configured to be limited to a range of light redirection device angles in the range of 30 to 46 degrees. In other embodiments a light redirection device is limited to a range of angles where the largest angle is than 46 degrees. In still other embodiments a light redirection device is limited to a range of angles where the largest angle is less ant 45 degrees and greater than 30 degree.

The tilt or slope in the portion of the cover glass covering an aperture may be relatively small and in some embodiments is in the range of 2 to 10 degrees resulting in a slight slope relative to the flat surface of the face of the camera device.

An exemplary camera device in accordance with some embodiments comprises: a first optical chain including: a first outer protective element including an antireflective coating on both the inside and outside surface of said first outer protective element, said outer protective element being a first lens or cover through which light can pass; a light redirection device; and a sensor. In some embodiments the light redirection device is a plane mirror.

In some embodiments the camera device further comprises: a second optical chain including: i) a second outer protective element which does not include an antireflective coating on the outside surface of the second outer protective element, said second outer protective element being a second lens or second cover through which light can pass, said second o a second sensor, said second optical chain not including a light redirection device. In some embodiments the second outer protective element is a flat piece of glass including a hole which is an opening through which light can pass into the first optical chain.

An exemplary method of operating a camera device in accordance with one embodiment comprises: operating a first optical chain including a first outer protective element sloped relative to a face of said camera device and extending at least partially below the surface of said face of said camera, a light redirection device and a sensor to capture an image of a scene area, said outer protective element being a first lens or cover through which light can pass; and storing said image captured by said first optical chain in a memory.

An exemplary camera device comprises: a camera housing including a front surface, said front surface including a plurality of openings corresponding to a plurality of optical chains through which light enters each of said plurality of optical chains; and a first optical chain including a first cover glass covering a first opening through which light enters said first optical chain, a portion of said first cover glass being recessed inside the front surface of said camera housing.

In some embodiments the first cover glass is recessed inside the front surface of said camera housing such that the first cover glass is tilted at an angle relative to the front surface of the camera. In some embodiments the angle depends on the field of view (FOV) of the first optical chain to which the first cover glass corresponds, a cover glass corresponding to an optical chain having larger FOV being tilted at a steeper angle than a cover glass corresponding to an optical chain having smaller FOV. In some embodiments the angle relative to the front surface of the camera is between 2 degrees to 6 degree.

In some embodiments the first optical chain is a 70 mm focal length camera module having a FOV of 34.4 degrees, and the angle of tilt of the first cover glass is 5.73 degrees. In some embodiments the first optical chain is a 150 mm focal length camera module having a FOV of 16.4 degrees, and the angle of tilt of said first cover glass is 2.73 degrees.

In some embodiments the camera device further comprises: a second optical chain including a second cover glass covering a second opening through which light enters said second optical chain, said second cover glass lying flat relative to the front surface of said camera housing and no portion of said second cover glass being recessed inside the front surface of said camera housing. In some embodiments the first cover glass has an antireflective coating on both top and bottom surfaces of said first cover glass. In some embodiments the second cover glass does not have an antireflective coating on both top and bottom surface of said second cover glass. In some embodiments the second cover glass has an antireflective coating on its top surface but not on its bottom surface.

In some embodiments one or more of the optical chains with the shorter focal length are used as reference cameras and wherein image captured by other optical chains in the camera device are combined to generate a composite image which is stored and output or displayed to a user of the camera device. One or more of the optical chains may be and sometimes are operated in parallel to capture images with the shorter focal length optical chain comparing a scene area including portions included in the images captured by the other optical chains.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images may be and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/ or routines, for implementing the methods of the present invention and/or for transiting captured images or generated composite images to other devices for storage or display.

What is claimed is:

1. A camera device, comprising:
   a glass cover plate including a flat outer surface portion and a first outer protective element; and
   a first optical chain including:
   said first outer protective element, said first outer protective element having an outer surface that is sloped relative to the flat outer surface portion of the glass cover plate extends at least partially below the surface of said flat outer surface portion of the glass cover plate, said first outer protective element being a first lens or cover portion through which light can pass;
   a light redirection device; and
   a sensor.

2. The camera device of claim 1, wherein said first outer protective element is coated with an anti-reflective coating on an inside surface of said first outer protective element.

3. The camera device of claim 2, wherein said first outer protective element is coated with an anti-reflective coating on both the inside surface and an outside surface.

4. The camera device of claim 2, wherein said light redirection device includes a pivot in close proximity to an inside surface of a camera face of said camera device.

5. The camera device of claim 4, wherein said pivot is a hinge located at one end of the light redirection device and which is secured to a camera chassis to which said first optical chain including said sensor is mounted.

6. The camera device of claim 4, wherein said pivot is located at one end of the light redirection device rather than in the middle of the light redirection device.

7. The camera device of claim 6, wherein said light redirection device is configured to support a range of light redirection device angles in a range between 0 and 47 degrees.

8. The camera device of claim 6, wherein said light redirection device is configured to support a range of light redirection device angles in the range of 30 to 46 degrees.

9. The camera device of claim 6, wherein the light redirection device is configured to support a range of light redirection device angles in the range of 40 degrees to an angle which is less than 46 degrees.

10. The camera device of claim 1,
    wherein said camera device includes a plurality of optical chains having different focal lengths;
    wherein said first optical chain has a focal length which is the largest of any of the optical chains included in said camera device; and
    wherein said camera device includes a second optical chain, said second optical chain having a shorter focal length than said first optical chain and including a second outer protective element which is flat relative to the flat outer surface portion of the glass cover plate.

11. The camera device of claim 10 wherein said first outer protective element is a tapered area of said glass cover plate, said tapered area corresponding to an aperture of the first optical chain, said glass cover plate not being tapered over an aperture of the second optical chain.

12. The camera device of claim 11, wherein the outer surface of said second protective element is not coated with an anti-reflective coating.

13. A camera device, comprising:
    a glass cover plate including a flat outer surface portion and a first outer protective element, said first outer protective element having an outer surface that is sloped relative to the flat outer surface portion of the glass cover plate, said first outer protective element extending at least partially below the surface of said flat outer surface portion of the glass cover plate and including an anti-reflective coating on both an inside surface and an outside surface of said first outer protective element, said first outer protective element being a first lens or cover through which light can pass;
    a sensor; and
    a light redirection device for redirecting light passing through said first outer protective element towards said sensor.

14. The camera device of claim 13, wherein said light redirection device is a plane mirror.

15. The camera device of claim 13,
    wherein the first outer protective element, said sensor and said light redirection device are part of a first optical chain, the camera device further comprising:

a second optical chain including: a second outer protective element which does not include an antireflective coating on the outside surface of the second outer protective element, said second outer protective element being a second lens or second cover through which light can pass to a second sensor, said second optical chain not including a light redirection device.

16. The camera device of claim 15, wherein said second outer protective element is a flat piece of said glass cover plate that covers an aperture of the second optical chain through which light can pass into the second optical chain.

17. A method of operating a camera device, the method comprising:
operating a first optical chain including a first outer protective element having an outer surface sloped relative to a flat outer surface portion of a glass cover plate in which said first outer protective element is located, said first outer surface of the first outer protective element extending at least partially below the flat outer surface portion of the glass cover plate, a light redirection device and a sensor, to capture an image of a scene area, said first outer protective element being a first lens or cover through which light can pass; and
storing said image captured by said first optical chain in a memory.

18. The method of claim 17,
wherein said camera device includes a plurality of optical chains having different focal lengths; and
wherein said first optical chain has a focal length which is the largest of any of the optical chains included in said camera device.

19. The method of claim 18, wherein said camera device includes a second optical chain, said second optical chain having a shorter focal length than said first optical chain and including a second outer protective element which is flat relative to the flat outer surface portion of the glass cover plate, said second outer protective element being located in said glass cover plate; and
wherein the method further comprises operating said second optical chain to capture an image of said scene area.

20. The method of claim 17, wherein the first outer protective element is recessed from the surface of said flat outer surface portion of the glass cover plate more on a first side than on a second side, dirt collection areas being present on said first and second sides into which dirt can be wiped without dirt in the direct collection areas obstructing an aperture of the first optical chain through which light can pass.

* * * * *